United States Patent [19]
Hisano et al.

[11] Patent Number: 5,961,419
[45] Date of Patent: Oct. 5, 1999

[54] LUBRICANT CONTROL APPARATUS FOR AUTOMATIC TRANSMISSION

[75] Inventors: Takayuki Hisano; Kazumasa Tsukamoto; Masahiro Hayabuchi; Satoru Kasuya, all of Anjo, Japan

[73] Assignee: Aisin AW Co., Ltd., Anjo, Japan

[21] Appl. No.: 08/957,748

[22] Filed: Oct. 24, 1997

[51] Int. Cl.$^6$ .............................. F01M 9/00; F16H 59/60; F16H 59/64; F16H 61/26
[52] U.S. Cl. .............................. 477/97; 477/98; 477/156; 184/6.12
[58] Field of Search ............................... 74/4.7; 475/159; 477/76, 97, 98, 156; 701/29; 184/6.12, 7.4

[56] References Cited

U.S. PATENT DOCUMENTS

| | | | |
|---|---|---|---|
| 4,678,069 | 7/1987 | Yoshimura et al. | 477/76 |
| 5,060,770 | 10/1991 | Hirano et al. | 477/98 |
| 5,182,970 | 2/1993 | Goto et al. | 477/98 X |
| 5,199,326 | 4/1993 | Iwatsuki et al. | 477/98 |
| 5,275,069 | 1/1994 | Baba et al. | 477/98 X |
| 5,456,129 | 10/1995 | Tane et al. | |
| 5,558,597 | 9/1996 | Oba et al. | 477/98 |

FOREIGN PATENT DOCUMENTS

| | | |
|---|---|---|
| A-58-221060 | 12/1983 | Japan . |
| A-59-83865 | 5/1984 | Japan . |
| A-5-149418 | 6/1993 | Japan . |

Primary Examiner—Charles A Marmor
Assistant Examiner—Roger Pang
Attorney, Agent, or Firm—Oliff & Berridge, PLC

[57] ABSTRACT

A lubricant control apparatus for an automatic transmission including a lubricating unit for feeding the lubricating oil to the portions of a speed change mechanism so that the heat to be generated in the speed change mechanism may be absorbed and recovered by the lubricating oil. The lubricant control apparatus includes a detector that detects the acting state of the speed change mechanism; a determiner that determines a necessary lubricating oil flow on the basis of the calorific value in the speed change mechanism, the calorific value being calculated from the detected acting state of the speed change mechanism; and a structure for feeding the lubricating oil to the speed change mechanism on the basis of the determined necessary lubricating oil flow. The lubricant control apparatus feeds an optimum lubricating oil flow according to the acting state of the speed change mechanism.

23 Claims, 14 Drawing Sheets

LUBRICANT CONTROL APPARATUS FOR AUTOMATIC TRANSMISSION

BACKGROUND OF THE INVENTION

1. Field of Invention

The invention relates to a lubricant control apparatus for an automatic transmission and, more particularly, to a technique for controlling a lubricating oil flow in accordance with the situation of a speed change mechanism.

2. Description of Related Art

In the prior art, the automatic transmission is provided with a hydraulic control unit for feeding a line pressure to control the hydraulic servos of its frictional engagement elements, on the basis of a solenoid signal to be outputted from an electronic control unit, so that the frictional engagement element may be applied/released for a speed change. This hydraulic control unit acts as a feeding means for feeding a secondary pressure for transmitting the power in a torque converter and a lubrication pressure for lubricating the individual portions of the speed change mechanism. Therefore, the hydraulic control unit is usually equipped with a primary regulator valve for regulating the pump discharge pressure to the line pressure, and a secondary regulator valve for regulating the excess pressure to a secondary pressure, so that the excess pressure, as regulated by the secondary regulator valve, is fed as a lubrication pressure to the individual portions of the mechanism.

As one system for controlling the regulating actions of the secondary regulator valve, there is disclosed in Japanese Patent Laid-Open No. 221060/1983 (called herein "Related Art 1") a technique in which a throttle pressure is applied to the secondary regulator valve. According to this technique, the lubricating pressure is regulated according to the throttle opening so that the lubricating oil flow to be fed to the individual mechanism portions accords substantially to the input torque to the transmission, i.e., to the vehicle running load.

There is another technique in which the secondary regulator valve is caused to perform the pressure regulation by applying a governor pressure, as disclosed in Japanese Patent Laid-Open No. 83865/1984 (called herein "Related Art 2"). According to this second technique, the lubricating pressure changes according to the vehicle speed so that the lubricating oil flow accords to the vehicle speed.

Here, the lubricating oil is mostly used to cool the heat generated by the gear meshing portions and the frictional engagement elements of the speed change mechanism. In the Related Art 1, therefore, the load condition is referred to the input torque thereby to feed the lubricating oil in a flow according to the throttle opening. In the Related Art 2, the lubricating oil is fed in a flow according to the vehicle speed by referring the load condition to the rotational speed. More specifically, the aforementioned calorific value is different among the individual portions of the mechanism so that it is not always uniquely determined according to the magnitude of the throttle opening or the vehicle speed.

At a steady run without any shift, the calorific value is dependent upon the power loss, which is different at the individual gear stages established by the speed change mechanism. In this respect, the techniques of the related art do not consider the gear stages but have to set the lubricating oil flow to match the gear stage of high loss so that they may be able to cool by sufficient lubrication for every gear stage. At a time of establishing a gear stage of low loss, therefore, the lubricating oil flow is excessive so that the excessive lubricating oil is agitated by the rotary members of the speed change mechanism to cause a dragging resistance thereby lowering the efficiency of the transmission.

At a shifting time, on the other hand, heat is generated in the frictional engagement elements as these elements are applied and released. In order to remove the heat quickly, therefore, the lubricating oil flow has to be increased at the shift time. In the related art, however, a control cannot be executed to increase the lubricating oil flow especially at the shift time. As a result, the cooling rate of the frictional engagement elements is low. At a busy shift time having frequent speed changes, for example, the temperature of the frictional engagement elements may rise to deteriorate the shifting characteristics. Considering the cooling at this shift time, therefore, the problem of the temperature rise of the frictional engagement elements is solved by increasing the oil flow at the steady run. This setting of the lubricating oil flow further lowers the aforementioned transmission efficiency.

SUMMARY OF THE INVENTION

It is, therefore, a first object of the invention to provide a lubricant control apparatus for an automatic transmission, which is enabled to prevent the drop in the transmission efficiency and the temperature rise of the frictional engagement elements by calculating the calorific value in the speed change mechanism and by feeding the lubricating oil flow based on the calculated calorific value.

A second object of the invention is to cause the fed oil flow to correspond to the drive loss of each gear stage by calculating the calorific values according to the individual gear stages.

A third object of the invention is to calculate the calorific value more accurately by detecting the acting state of the speed change mechanism totally from a plurality of data.

A fourth object of the invention is to cause the fed oil flow to correspond to the calorific value accompanying the applied/released actions of the frictional engagement elements by calculating the calorific value in the frictional engagement elements at the shift time.

Here, the frictional engagement elements at the engaged side at the shift time are not always cooled sufficiently till the end of engagement even if the lubricating oil flow in the engagement process is increased, and the cooling is more difficult after the engagement than at the released time. It is, therefore, a fifth object of the invention to ensure the cooling of the frictional engagement elements by continuing the increased feed of the lubricating oil properly even after the shift end.

A sixth object of the invention is to ensure the cooling of the frictional engagement elements by extending the aforementioned increased feed after the shift end when the lubricating oil temperature is high.

Even if a lubricating oil flow sufficient for cooling the frictional engagement elements is fed at each shift time, the heat may be accumulated in the frictional engagement elements when the shifts are frequently performed to shorten the shift interval. It is, therefore, a seventh object of the invention to perform the feed of lubricating oil, to match the busy shift.

An eighth object of the invention is to make the control of the lubricating oil flow according to the first to seventh objects, independently without being restricted by the line pressure control for applying/releasing the frictional engagement elements unlike the related art.

A ninth object of the invention is to provide a lubricant control apparatus for an automatic transmission, which is enabled to prevent the reduction in the transmission efficiency by determining the lubricating oil flow according to each gear shift in accordance with the fact that the calorific values in the speed change mechanism are different as a result of the drive losses at the individual gear stages, thereby preventing the lubricating oil flow from increasing more than is necessary at each gear stage.

A tenth object of the invention is to cause the determination of the lubricating oil flow according to the ninth object to match the situations more on the basis of the plural data indicating the acting states of the speed change mechanism.

In order to achieve the ninth and tenth objects, moreover, an eleventh object of the invention is to match the calorific value better by determining the fed oil flow while considering the actions of the frictional engagement elements as the acting state of the speed change mechanism.

In order to achieve the ninth and tenth objects, moreover, a twelfth object of the invention is to simplify the correspondence to the calorific value better by increasing the fed oil flow at the shift time.

In order to achieve the ninth to twelfth objects, moreover, a thirteenth object of the invention is to cool the frictional engagement elements reliably by continuing the increased feed of the lubricating oil properly even after the shift end.

In order to achieve the ninth to thirteenth objects, moreover, a fourteenth object of the invention is to cool the frictional engagement element more reliably by extending the increased feed after the shift end when the lubricating oil temperature is high.

In addition to achieving the ninth to fourteenth objects, moreover, a fifteenth object of the invention is to perform the feed of lubricating oil, as can also correspond to the busy shift time.

A sixteenth object of the invention is to make the control of the lubricating oil flow according to the ninth to fifteenth objects, independently without being restricted by the line pressure control for applying/releasing the frictional engagement elements.

A seventeenth object of the invention is to provide a lubricant control apparatus for an automatic transmission, which is enabled to quickly lower the heat generated in the frictional engagement elements at the shift time by increasing the lubricating oil flow as the calorific value in the frictional engagement elements increases during the shift.

In order to achieve the seventeenth object, moreover, an eighteenth object of the invention is to cause the fed oil flow to correspond to the calorific value more by considering the actions of the frictional engagement elements as the acting state of the speed change mechanism.

In order to achieve the seventeenth and eighteenth objects, moreover, a nineteenth object of the invention is to perform the cooling of the frictional engagement elements reliably by continuing the increased feed of the lubricating oil properly even after the shift end.

In order to achieve the seventeenth, eighteenth and nineteenth objects, moreover, a twentieth object of the invention is to cool the frictional engagement elements more reliably by elongating the increased feed after the shift end when the lubricating oil temperature is high.

A twenty first object of the invention is, in addition to achieving the seventeenth to twentieth objects, to perform the feed of the lubricating oil to also correspond to the busy shift time.

A twenty second object of the invention is to make the control of the lubricating oil flow according to the seventeenth to twenty first objects, independently without being restricted by the line pressure control for applying/releasing the frictional engagement elements.

In order to achieve the seventeenth object, moreover, a twenty third object of the invention is to ensure the cooling of the frictional engagement elements by continuing the increased feed of the lubricating oil properly even after the shift end.

In order to achieve the seventeenth and twenty third objects, moreover, a twenty fourth object of the invention is to more reliably ensure the cooling of the frictional engagement elements by extending the increased feed of the frictional engagement elements after the shift end when the lubricating oil temperature is high.

A twenty fifth object of the invention is to make the control of the lubricating oil flow according to the seventeenth, twenty third and twenty fourth objects, independently with a simple structure without being restricted by the line pressure control for applying/releasing the frictional engagement elements.

In order to achieve the first object, according to the invention, there is provided a lubricant control apparatus for an automatic transmission including a lubricating unit for feeding the lubricating oil to the portions of a speed change mechanism so that the heat generated in the speed change mechanism may be absorbed and recovered by the lubricating oil, the lubricant control apparatus comprising detecting means for detecting the acting state of the speed change mechanism; a determining means for determining a necessary lubricating oil flow on the basis of the calorific value in the speed change mechanism, the calorific value being calculated from the detected acting state of the speed change mechanism; and a feeding means for feeding the lubricating oil to the speed change mechanism on the basis of the determined necessary lubricating oil flow.

In order to achieve the second object, the determining means calculates the calorific value of the speed change mechanism, on the basis of each gear stage established by the speed change mechanism.

In order to achieve the third object, the determining means calculates the calorific value of the speed change mechanism, on the basis of each gear stage established by the speed change mechanism, the input torque to the speed change mechanism and the input RPM to the speed change mechanism.

In order to achieve the fourth object, the lubricant control apparatus further comprises a deciding means for deciding whether the automatic transmission is shifting, and the determining means calculates the calorific value, when the decision is affirmed, on the basis of the calorific value in the frictional engagement elements which are applied and/or released during the shift.

In order to achieve the fifth object, the determining means determines the necessary lubricating oil flow for a predetermined time period after the end of the shift by addition of a predetermined amount to the lubricating oil flow based on the calorific value.

In order to achieve the sixth object, the predetermined time period is set longer when the temperature of the lubricating oil is higher.

In order to achieve the seventh object, the lubricant control apparatus further comprises an interval detecting means for detecting a shift interval, and the determining means corrects to increase the necessary lubricating oil flow for the predetermined time period after the shift end when the shift interval is short.

In order to achieve the eighth object, the feeding means includes an oil pressure source; a first pressure regulating valve for regulating the oil pressure from the oil pressure source to a line pressure; a second pressure regulating valve for regulating the line pressure to a lubricating oil pressure according to a signal pressure; an oil passage for feeding the lubricating oil pressure from the second pressure regulating valve to the speed change mechanism through an orifice; a solenoid valve for applying the signal pressure to the second pressure regulating valve; and an output means for outputting an electric signal to the solenoid valve so that such an oil pressure is produced that the oil flow through the orifice becomes the necessary lubricating oil flow.

In order to achieve the ninth object, according to the invention, there is provided a lubricant control apparatus for an automatic transmission including a lubricating unit for feeding the lubricating oil to the portions of a speed change mechanism so that the heat generated in the speed change mechanism may be absorbed and recovered by the lubricating oil, the lubricant control apparatus comprising: a detecting means for detecting the acting state of the speed change mechanism, which includes at least a plurality of gear stages; a determining means for determining a necessary lubricating oil flow on the basis of a detected gear stage; and a feeding means for feeding the lubricating oil to the speed change mechanism on the basis of the determined necessary lubricating oil flow.

In order to achieve the tenth object, the determining means determines the necessary lubricating oil flow on the basis of not only a gear stage of the speed change mechanism, but the input torque to the speed change mechanism and the input RPM to the speed change mechanism.

In order to achieve the eleventh object, the lubricant control apparatus further comprises a deciding means for deciding whether the automatic transmission is shifting, and the determining means determines the necessary lubricating oil flow, when the decision is affirmed, on the basis of the calorific value in frictional engagement elements which is applied and/or released during the shift.

In order to achieve the twelfth object, the lubricant control apparatus further comprising: a deciding means for deciding whether the automatic transmission is shifting, and the determining means increases the necessary lubricating oil flow when the decision is affirmed.

In order to achieve the thirteenth object, the determining means increases the necessary lubricating oil flow for a predetermined time period after the shift end.

In order to achieve the fourteenth object, the predetermined time period is set longer when the temperature of the lubricating oil is higher.

In order to achieve the fifteenth object, the lubricant control apparatus further comprises an interval detecting means for detecting a shift interval, and the determining means corrects to increase the necessary lubricating oil flow for the predetermined time period after the shift end when the shift interval is short.

In order to achieve the sixteenth object, the feeding means includes an oil pressure source; a first pressure regulating valve for regulating the oil pressure from the oil pressure source to a line pressure; a second pressure regulating valve for regulating the line pressure to a lubricating oil pressure according to a signal pressure; an oil passage for feeding the lubricating oil pressure from the second pressure regulating valve to the speed change mechanism through an orifice; a solenoid valve for applying the signal pressure to the second pressure regulating valve; and an output means for outputting an electric signal to the solenoid valve so that such an oil pressure is produced that the oil flow through the orifice becomes the necessary lubricating oil flow.

In order to achieve the seventeenth object, there is provided a lubricant control apparatus for an automatic transmission including a lubricating unit for feeding the lubricating oil to the portions of a speed change mechanism so that the heat to be generated in the speed change mechanism may be absorbed and recovered by the lubricating oil, the lubricant control apparatus comprising a detecting means for detecting the acting state of the speed change mechanism; a deciding means for deciding whether the transmission is shifting, from the acting state; and an increasing means for increasing the lubricating oil flow to the speed change mechanism when the decision is affirmed.

In order to achieve the eighteenth object, the increasing means increases the lubricating oil flow on the basis of the calorific value in the frictional engagement elements when they are applied and/or released during the shift.

In order to achieve the nineteenth object, the increasing means increases the lubricating oil flow for a predetermined time period after the shift end.

In order to achieve the twentieth object, the predetermined time period is set longer when the temperature of the lubricating oil is higher.

In order to achieve the twenty first object, the lubricant control system further comprises an interval detecting means for detecting a shift interval, and the determining means corrects to increase the necessary lubricating oil flow for the predetermined time period after the shift end when the shift interval is short.

In order to achieve the twenty second object, the feeding means includes an oil pressure source; a first pressure regulating valve for regulating the oil pressure from the oil pressure source to a line pressure; a second pressure regulating valve for regulating the line pressure to a lubricating oil pressure according to a signal pressure; an oil passage for feeding the lubricating oil pressure from the second pressure regulating valve to the speed change mechanism through an orifice; a solenoid valve for applying the signal pressure to the second pressure regulating valve; and output means for outputting an electric signal to the solenoid valve for a lubricating oil pressure to increase the lubricating oil flow.

In order to achieve the twenty-third object, the increasing means increases the lubricating oil flow to the speed change mechanism for a predetermined time period after the shift end.

In order to achieve the twenty-fourth object, the predetermined time period is set longer when the temperature of the lubricating oil is higher.

In order to achieve twenty-fifth object, the increasing means is a means which is disposed in an oil passage to feed the lubricating oil from the oil pressure source to the speed change mechanism, for increasing the opening area of the orifice.

According to the structure to achieve the first object, the necessary lubricating oil flow is determined by calculating the calorific value in the speed change mechanism. As a result, it is unnecessary to increase the lubricating oil flow more than required, and it is possible to prevent the reduction in the transmission efficiency of the transmission due to the agitation of the oil and to prevent the temperature rise of the frictional engagement elements.

According to the structure to achieve the second object, moreover, the necessary lubricating oil flow can be made different for the individual gear stages according to the driving losses, i.e., the calorific values.

According to the structure to achieve the third object, moreover, the lubricating oil flow can be made to accord accurately to the calorific value by determining the necessary lubricating oil flow while considering the driving losses, the input torques and the RPMs, which are different for the individual gear stages.

According to the structure to achieve the fourth object, moreover, the necessary lubricating oil flow is calculated according to the calorific value of the frictional engagement elements so that the heat generation of the frictional engagement elements at the shift time can be promptly reduced to prevent the temperature rise at the busy shift time.

According to the structure to achieve the fifth object, moreover, when the frictional engagement elements are to be applied, their gap may be reduced to make the increased lubricating oil unable to cool the whole calorific value. By making the necessary lubricating oil flow more at the shift end than that corresponding to the calorific value, therefore, the frictional engagement elements can be cooled without fail.

According to the structure to achieve the sixth object, moreover, when the temperature of the lubricating oil is higher, the cooling efficiency is lowered. By calculating the necessary lubricating oil flow according to the temperature to determine the increased time of the oil flow after the shift end, therefore, the frictional engagement elements can be cooled without fail.

According to the structure to achieve the seventh object, moreover, at the busy shift time when the shift interval is short, the heat is liable to be accumulated in the frictional engagement elements. When the shift interval is short, therefore, the frictional engagement elements can be reliably cooled by increasing the necessary lubricating oil flow.

According to the structure to achieve the eighth object, moreover, the lubricating oil pressure can be controlled independently of the control of the line pressure. Without being restricted by the line pressure control, therefore, the lubricating oil pressure can be properly controlled according to the calculated necessary lubricating oil flow.

According to the structure to achieve the ninth object, moreover, the lubricating oil flow can be related with the individual gear stages to the different driving losses or the heat generation. At the individual gear stages, therefore, the lubricating oil flow need not be increased more than necessary so that the reduction in the transmission efficiency of the transmission due to the agitation of the oil can be prevented.

According to the structure to achieve the tenth object, moreover, the lubricating oil flow can be controlled accurately according to the calorific value by the different drive losses, input torques and RPMs for the individual gear stages.

According to the structure to achieve the eleventh object, moreover, the heat generation of the frictional engagement elements at the shift time can be promptly reduced to suppress the temperature rise at the busy shift time.

According to the structure to achieve the twelfth object, moreover, during the shift, the lubricating oil flow is increased so that the heat generation of the frictional engagement elements at the shift time can be promptly reduced to suppress the temperature rise at the busy shift time. At steady run, other than the shift time, moreover, the lubricating oil flow need not be increased according to the shift so that the reduction in the transmission efficiency can be prevented.

According to the structure to achieve the thirteenth object, moreover, when the frictional engagement elements are to be applied, the gap is reduced, and the calorific value may not be cooled completely by the increased lubricating oil. By providing the lubricating oil after the shift end, therefore, the frictional engagement elements can be cooled without fail.

According to the structure to achieve the fourteenth object, moreover, when the temperature of the lubricating oil is higher, the cooling efficiency is also lowered. By determining the increased time of the oil flow after the shift end based on the temperature, the frictional engagement elements can be cooled without fail.

According to the structure to achieve the fifteenth object, moreover, at the busy shift time when the shift interval is short, the heat is liable to be accumulated in the frictional engagement elements. When the shift interval is short, the frictional engagement elements can be reliably cooled by increasing the lubricating oil flow.

According to the structure to achieve the sixteenth object, moreover, the lubricating oil pressure can be controlled independently of the line pressure so that the lubricating oil pressure control can be made without being restricted by the line pressure control.

According to the structure to achieve the seventeenth object, moreover, during the shift, the lubricating oil flow is increased so that the heat generation of the frictional engagement elements at the shift time can be promptly reduced to suppress the temperature rise at the busy shift time. At steady run, other than the shift time, moreover, the lubricating oil flow need not be increased according to the shift so that the reduction in the transmission efficiency can be prevented.

According to the structure to achieve the eighteenth object, moreover, the heat generation of the frictional engagement elements at the shift time can be promptly reduced to suppress the temperature rise at the busy shift time.

According to the structure to achieve the nineteenth object, moreover, when the frictional engagement elements are to be applied, the gap is reduced, and the calorific value may not be cooled completely by the increased lubricating oil. By providing the lubricating oil after the shift end than that corresponding to the calorific value, therefore, the frictional engagement elements can be cooled without fail.

According to the structure to achieve the twentieth object, moreover, when the temperature of the lubricating oil is higher, the cooling efficiency is also lowered. By determining the increased time of the oil flow after the end of the shift based on the temperature, the frictional engagement elements can be cooled without fail.

According to the structure to achieve the twenty-first object, moreover, at the busy shift time when the shift interval is short, the heat is liable to be accumulated in the frictional engagement elements. When the shift interval is short, the frictional engagement elements can be reliably cooled by increasing the lubricating oil flow.

According to the structure to achieve the twenty-second object, moreover, the lubricating oil pressure can be controlled independently of the line pressure so that the lubricating oil pressure control can be executed without being restricted by the line pressure control.

According to the structure to achieve the twenty-third object, moreover, when the frictional engagement elements are to be applied, the gap is reduced, and the calorific value may not be cooled completely by the increased lubricating oil. By providing the lubricating oil after the shift end than that corresponding to the calorific value, therefore, the frictional engagement elements can be cooled without fail.

According to the structure to achieve the twenty-fourth object, moreover, when the temperature of the lubricating oil is higher, the cooling efficiency is also lowered. By determining the increased time of the oil flow after the end of the shift based on the temperature, the frictional engagement elements can be cooled without fail.

According to the structure to achieve the twenty-fifth object, moreover, the lubricating oil flow can be changed with the simple structure.

DETAILED DESCRIPTION OF PREFERRED EMBODIMENTS

Figure 1:
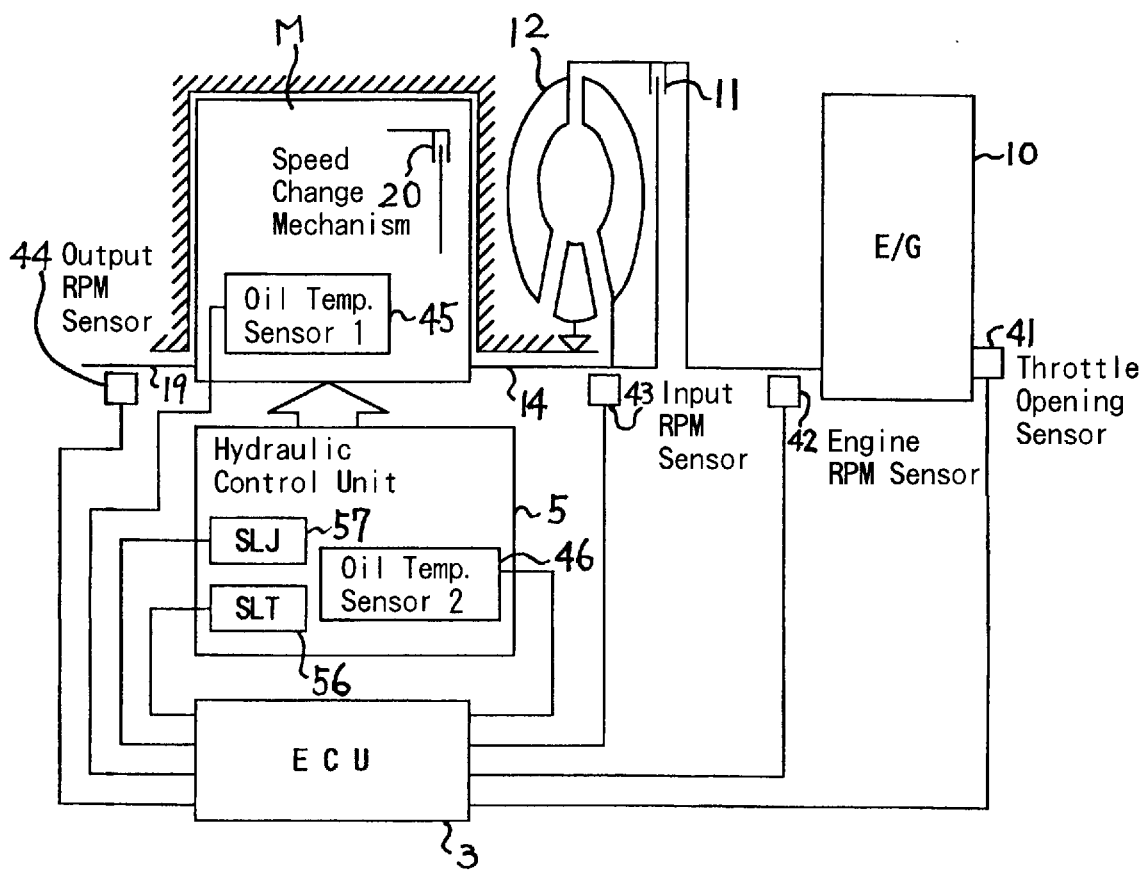
FIG. 1 is a block diagram showing a lubricant control apparatus for an automatic transmission according to a first embodiment of the invention.

The invention will be described in connection with its embodiments with reference to the accompanying drawings. FIGS. 1 to 11 show a first embodiment. The control apparatus is applied to an automatic transmission comprising a torque converter 12 having a lockup clutch 11 connected to an engine (E/G) 10 of a vehicle; a plurality of planetary gear units (not-shown) for changing the speed of the turbine output, which is transmitted from an input shaft 14, into a suitable gear stage to transmit it to an output shaft 19; frictional engagement elements 20, such as clutches and brakes, for causing the elements, such as the sun gears, the ring gears and the carriers of the pinion gears of the planetary gear units, to function as input elements, reaction elements and output elements; and a speed change mechanism M including a hydraulic servo for applying/releasing the frictional engagement elements 20.

The control apparatus for the automatic transmission thus structured comprises an electronic control unit (ECU) 3 and a hydraulic control unit 5. Connected to the electronic control unit 3 are a variety of sensors which are arranged on the engine 10 of the vehicle and the automatic transmission for detecting the operating states of the various portions. The engine 10 is provided with a throttle opening sensor 41, for detecting the degree of opening of the throttle valve of the intake system, and an engine RPM sensor 42, for detecting the engine RPM from the revolutions of the engine output shaft. The automatic transmission is provided with an input RPM sensor 43 for detecting the RPM of the input to the transmission from the revolutions of the turbine output shaft, i.e., the transmission input shaft 14; an output RPM sensor 44 for detecting the output RPM from the revolutions of the transmission output shaft 19; a first oil temperature sensor 45 for detecting the drain oil temperature from the oil temperature of a return oil passage (as will be described below) in the speed change mechanism; and a second oil temperature sensor 46 for detecting a foreorifice oil temperature which is a temperature before the oil flows through the orifice 60 (FIG. 2), from the temperature of the oil flowing through an orifice (as will be described below) in a valve body of the hydraulic control unit 5.

Figure 2:
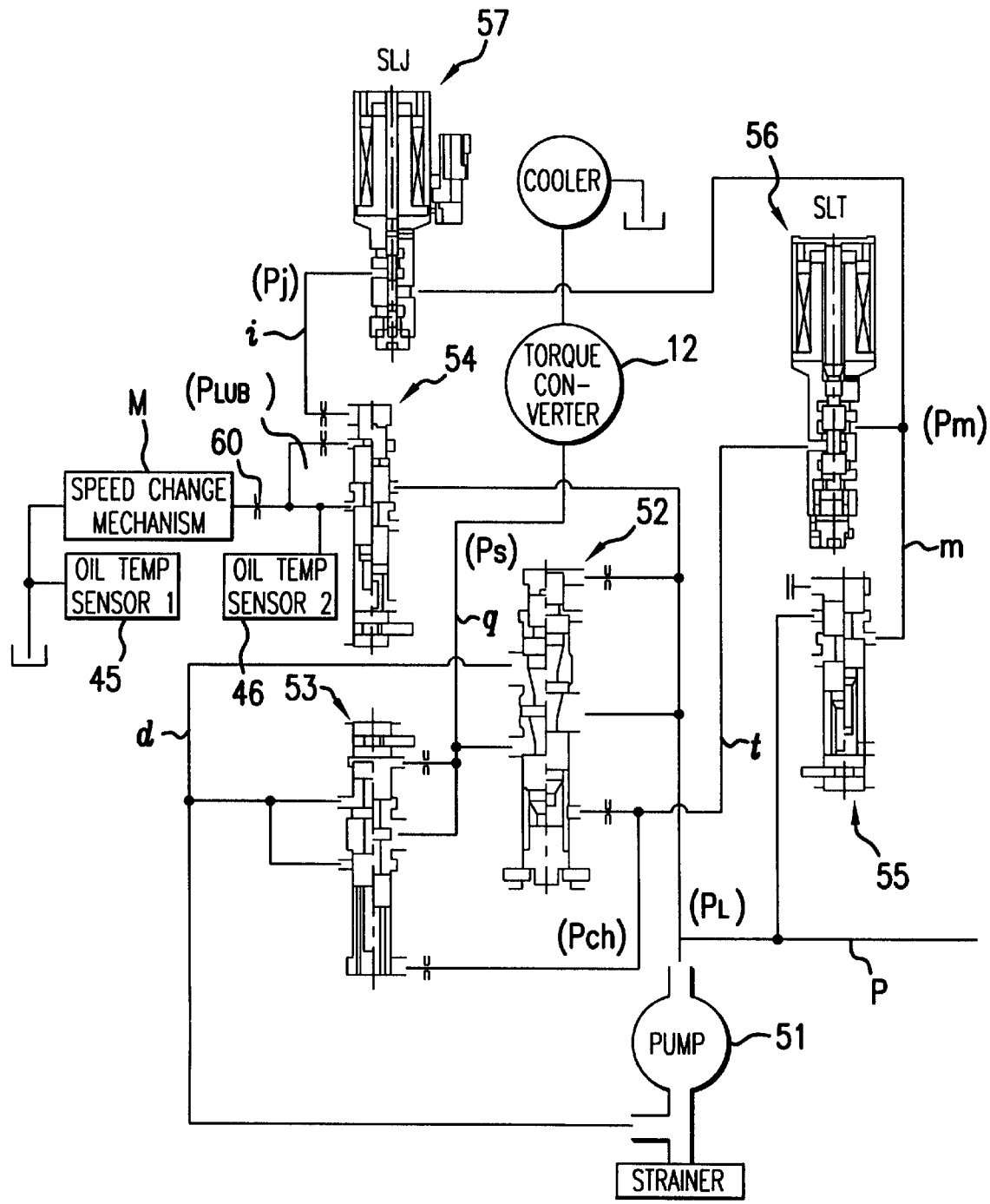
FIG. 2 is a partial circuit diagram showing a hydraulic control unit of the automatic transmission.

As shown in FIG. 2, a feeding means, according to the invention, for feeding the lubricating oil to the speed change mechanism is mounted in the hydraulic control unit 5 and includes an oil pressure source comprised of a pump 51 driven by the turbine output shaft of the torque converter 12; a primary regulator valve 52 arranged in the valve body and acting as a first pressure regulating valve for regulating the oil pressure of a line pressure oil passage p to feed the oil pressure from the oil pressure source to the hydraulic servo of each frictional engagement element 20, to a line pressure $P_L$; a lubricating control valve 54 acting as a second pressure regulating valve for outputting a lubricating oil pressure $P_{LUB}$ according to a signal pressure $P_j$ on the basis of the line pressure $P_L$ of the line pressure oil passage p; an oil passage j for feeding the lubricating oil from the control valve 54 through an orifice 60 to the speed change mechanism; and a linear solenoid valve (SLJ) 57 for applying the signal pressure $P_j$ to the control valve 54. In the first embodiment, the electric control unit 3 has an output means as a drive circuit for outputting an electric signal to the linear solenoid valve 57. Then, the linear solenoid valve 57 controls the control valve 54 so that the control valve 54 outputs the lubricating oil pressure $P_{LUB}$. At that time, the oil flow through the orifice 60 is a necessary lubricating oil flow.

More specifically, the primary regulator valve 52 is a pressure regulating valve connected with the line pressure oil passage p for regulating the line pressure $P_L$ while discharging it suitably into a secondary pressure oil passage q and a drain oil passage d. The primary regulator valve 52 is actuated by a throttle signal pressure $P_{th}$ applied to the spring-loaded end side of its spool and the line pressure $P_L$ fed back at the opposite end side. A secondary regulator valve 53 is a pressure regulating valve for regulating the oil pressure of the secondary pressure oil passage q while draining it suitably, as the oil pressure outputted by the primary regulator valve 52 is an applying source, although it has no direct relation to the subject of the invention. The secondary regulator valve 53 is actuated by the throttle signal pressure $P_{th}$ applied to the spring-loaded end side of its spool and a regulated secondary pressure $P_s$ fed back to the opposite end.

The lubricating control valve 54 is a pressure regulating valve connected with the line pressure oil passage p for outputting the lubricating oil pressure $P_{LUB}$ on the basis of the line pressure $P_L$. The lubricating control valve 54 is actuated by the signal pressure $P_j$ applied to one end of its spring-loaded spool and the regulated lubricating oil pressure $P_{LUB}$ fed back to its radially different portion. A solenoid modulator 55 is a pressure-reducing valve of secondary pressure feedback action connected with the line pressure oil passage p for reducing the line pressure $P_L$ as the basic pressure valve to an oil pressure suitable for the pressure regulation by the two linear solenoid valves 56, 57 and for outputting the reduced pressure to a modulator pressure oil passage m. The linear solenoid valve 56 is a pressure regulating valve of electromagnetic solenoid action connected with the modulator pressure oil passage m for outputting the throttle pressure $P_{th}$ on the basis of a modulator pressure $P_m$ to a throttle signal pressure oil passage t. The linear solenoid valve 57 is also a pressure regulating valve of electromagnetic solenoid action connected with the modulator pressure oil passage m for outputting the lubricating signal pressure $P_j$ on the basis of the modulator pressure $P_m$ to a lubricating signal pressure oil passage i.

In the lubricant control apparatus of the first embodiment according to the invention, a necessary lubricating oil flow L is calculated by the control processes for the steady run, during shift and at the shift end in accordance with the acting state of the speed change mechanism M thereby to feed the lubricating oil pressure $P_{LUB}$ according to the necessary lubricating oil flow L.

[Control at Steady Run]

The steady run control is performed while the vehicle maintains a predetermined speed stage or gear stage. In this case, the calorific value is determined by the stage number of the gear meshing portion participating in the power transmission. Therefore, the oil pressure control is performed to calculate and establish the necessary lubricating oil flow according to the calorific value in the speed change mechanism.

First, the calorific value ($Q_g$[Kcal/s]) per unit time due to the gear power loss is expressed by the following Formula 1:

$$Q_g = (G/100) Tin(2Nin/60)(1/J)  \qquad \text{Formula 1,}$$

where:

G: $1-\eta$,
and $\eta$: Gear efficiency at each gear stage (calculated from the meshing state of gears, as enumerated by Table 1 which present relationships between gear stages and gear efficiencies for a speed change mechanism of five forward and one reverse stage):

TABLE 1

| Gear stage | 1st | 2nd | 3rd | 4th | 5th | Rv |
|---|---|---|---|---|---|---|
| Gear Efficiency $\eta$ | $\eta 1$ | $\eta 2$ | $\eta 3$ | $\eta 4$ | $\eta 5$ | $\eta R$ |

Tin: Input torque to the speed change mechanism,
Nin: Input RPM to speed change mechanism,
and
J: Mechanical equivalent of heat.

Next, the calorific value ($Q_{tm}$[Kcal/s]) per unit time in the speed change mechanism is expressed by the following Formula 2:

$$Q_{tm} = Q_g \qquad \text{Formula 2.}$$

On the other hand, the cooling calorie ($Q_L$ [Kcal/s]) per unit time provided by the lubricating oil is expressed by the following Formula 3:

$$Q_L = Catf \cdot (\theta a - \theta b) \cdot (L \cdot \rho) \qquad \text{Formula 3.}$$

Where,

Catf: Specific heat of the automatic transmission working oil (ATF), $\theta a$: Drain temperature of ATF (i.e., temperature of lubricating oil discharged from speed change mechanism);

$\theta b$: foreorifice temperature of ATF (temperature of lubricating oil to be fed to speed change mechanism);

L: Lubricating oil flow;
and $\rho$: Specific gravity of ATF.

Figure 3:
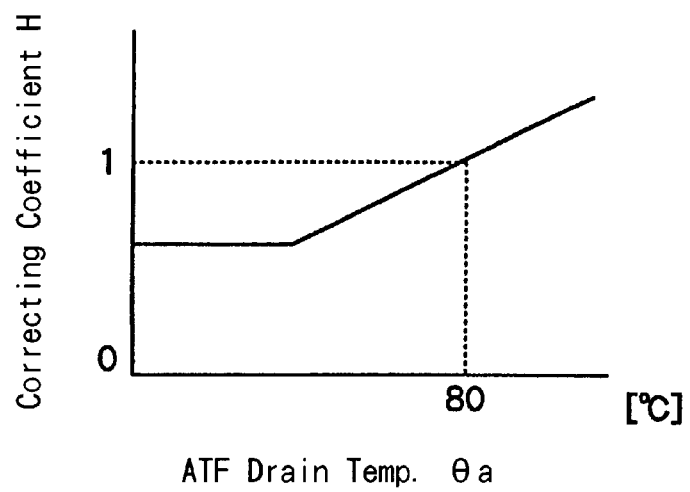
FIG. 3 is a graph illustrating the relationship between a correcting coefficient used in the lubricating oil control by the lubricant control apparatus and a drain oil temperature.

Therefore, the necessary lubricating oil flow (L[cm³/s]) may be calculated to equalize the calorific value due to the gear loss and the cooling calorie by the lubricating oil. In this calculation, the drain temperature $\theta a$ of the ATF is used to determine the cooling calorie $Q_L$, and a convergence is made to the drain temperature $\theta a$. Therefore, the lubricating oil flow L is not simply calculated to equalize the calorific value due to the gear loss and the cooling calorie by the lubricating oil, but the necessary lubricating oil flow L is determined by using a correcting coefficient H so as to approach a reference temperature (e.g., 80° C.). A relationship between the correcting coefficient H and the drain temperature $\theta a$ of the ATF is illustrated in FIG. 3. The correcting coefficient H makes a correction by lowering the calorific value $Q_{tm}$ for a lower drain temperature $\theta a$ and raising the calorific value $Q_{tm}$ for a higher drain temperature $\theta a$. In short, the necessary lubricating oil flow L is so calculated that the relationship between the cooling calorie $Q_L$ and the calorific value $Q_{tm}$ may satisfy the following Formula 4:

$$Q_{tm} \cdot H = Q_L \qquad \text{Formula 4.}$$

Formulas 1, 2 and 3 are then introduced into Formula 4 to achieve the following relationship:

$$(G/100) \cdot Tin \cdot (2\pi \cdot Nin/60) \cdot (1/J) \cdot H = Catf \cdot (\theta a - \theta b) \cdot (L \cdot \rho).$$

Hence, the necessary lubricating oil flow L is expressed by the following Formula 5:

$$L = (G \cdot Tin \cdot 2\pi \cdot Nin \cdot H)/(6000J \cdot Catf \cdot (\theta a - \theta b) \cdot \rho) \qquad \text{Formula 5.}$$

[Control at Shift]

For control at a shifting time, the lubricating oil flow is calculated by calculating the calorific value of the frictional engagement element to be applied/released at the shifting time and by adding the calorific value due to the gear power loss to the calculated calorific value to achieve the calorific value at the shifting time. At this time, the calorific value due to the gear loss is calculated with reference to the shifted gear stage. In the case of the clutch-to-clutch shift, moreover, the individual calorific values of the frictional engagement elements at the apply side and at the release side may be summed. Therefore, the calorific value ($Q_s$ [Kcal/s]) per unit time of the frictional engagement element is expressed by the following Formula 6:

$$Q_s=(1/J)\cdot Tin\cdot Tbn\cdot \omega \qquad \text{Formula 6.}$$

Where,

Tin: Input torque to the speed change mechanism,

Tbn: Torque sharing ratio (which is calculated from the gear ratio, as calculated by calculating the input RPM (Nin) and the output RPM (Nout) of the transmission, and the kind of shift because it changes with the progress of the shift) of the frictional engagement element to be calculated, ω: Relative rotational speed (which can be calculated from the change in the gear ratio and the kind of the shift) in the frictional engagement element, and J: Mechanical equivalent of heat.

On the other hand, the calorific value ($Q_g$ [Kcal/s]) per unit time due to the gear power loss is basically identical to that of the control at the steady run and is expressed by Formula 1:

$$Q_g=(G/100)\cdot Tin\cdot (2\pi\cdot Nin/60)\cdot (1/J) \qquad \text{Formula 1,}$$

Where,

G: $1-\eta$, and

η: Gear efficiency at each gear stage after the shift the shift.

The calorific value ($Q_{tm}$ [Kcal/s]) per unit time in the speed change mechanism is expressed by the following Formula 7:

$$Q_{tm}=Q_g+Q_s \qquad \text{Formula 7.}$$

Moreover, the cooling calorie ($Q_L$ [Kcal/s]) per unit time by the lubricating oil is basically identical to that of the control during the steady run and is expressed by Formula 3:

$$Q_L=Catf\cdot (\theta a-\theta b)\cdot (L\cdot \rho) \qquad \text{Formula 3.}$$

Therefore, the necessary lubricating oil flow (L[cm³/s]) is calculated to satisfy Formula 4:

$$Q_{tm}\cdot H=Q_L \qquad \text{Formula 4.}$$

Formulas 1, 3, 6 and 7 are then introduced into Formula 4 to achieve the following relationship:

$$(G/100)\cdot Tin\cdot (2\pi\cdot Nin/60)\cdot (1/J)+(1/J)\cdot Tin\cdot Tbn\cdot a))\cdot H;=Catf\cdot (\theta a-\theta b)\cdot (L\cdot \rho).$$

Hence, the necessary lubricating oil flow L is expressed by the following Formula 8:

$$L=Tin\cdot H\cdot (G\cdot 2\pi\cdot Nin/6000+Tbn\cdot a)/(J\cdot Catf\cdot (\theta a-\theta b)\cdot \rho) \qquad \text{Formula 8.}$$

[Control at Shift End]

Figure 4:
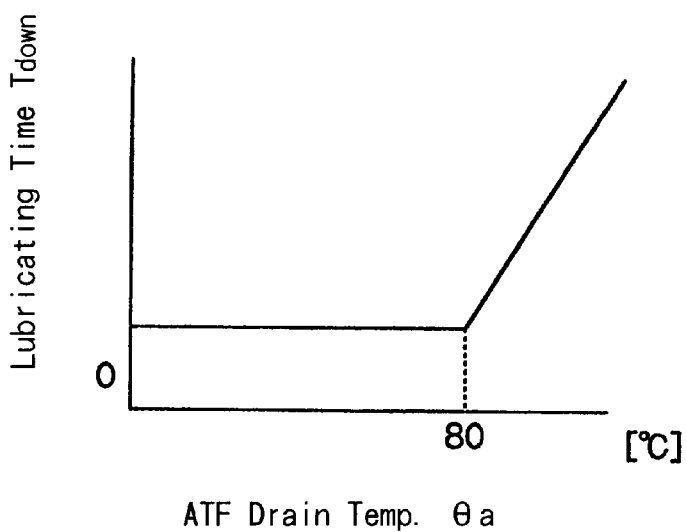
FIG. 4 is a graph illustrating the relationship between a lubricating time in the lubricating oil control and a drain oil temperature.

During the shift end control, the lubricating oil flow for cooling the calorific value at the shift has already been established by the control at the shift so that the calorific value at the shift is wholly cooled. At the time of application, however, the gap of the frictional engagement elements is so reduced that it receives little lubricating oil and, thus, is not always adequately cooled. It is therefore thought to be difficult to cool especially when the drain temperature of the ATF is high. The cooling is ensured by feeding a constant rate Ls of lubricating oil for a time Tdown according to the drain temperature. A relationship between the lubricating time Tdown and the drain temperature θa of the ATF is illustrated in FIG. 4. In this case, the lubricating oil flow is calculated as during the control for a shift by adding a constant value to the lubricating oil flow according to the calorific value due to the gear power loss.

In this case, the calorific value ($Q_g$ [Kcal/s]) per unit time due to the gear power loss is basically identical to that of the control during the steady run and is expressed by Formula 1:

$$Q_g=(G/100)\cdot Tin\cdot (2\pi\cdot Nin/60)\cdot (1/J) \qquad \text{Formula 1.}$$

Next, the calorific value ($Q_{tm}$ [Kcal/s]) per unit time in the speed change mechanism is basically identical to that of the control for the steady run and is expressed by Formula 2:

$$Q_{tm}=Q_g \qquad \text{Formula 2.}$$

Moreover, the cooling calorie ($Q_L$ [Kcal/s]) per unit time by the lubricating oil is basically identical to that during control for the steady run and is expressed by Formula 3:

$$Q_L=Catf\cdot (\theta a-\theta b)\cdot (L\cdot \rho) \qquad \text{Formula 3.}$$

Therefore, the necessary lubricating oil flow (L[cm³/s]) is calculated by adding a constant value Ls to the lubricating oil flow satisfying Formula 4:

$$Q_{tm}\cdot H=QL \qquad \text{Formula 4.}$$

$$L=(G\cdot Tin\cdot 2\cdot Nin\cdot H)/(6000J\cdot Catf\cdot (\theta a-\theta b)\cdot \rho)+Ls \qquad \text{Formula 9.}$$

Figure 5:
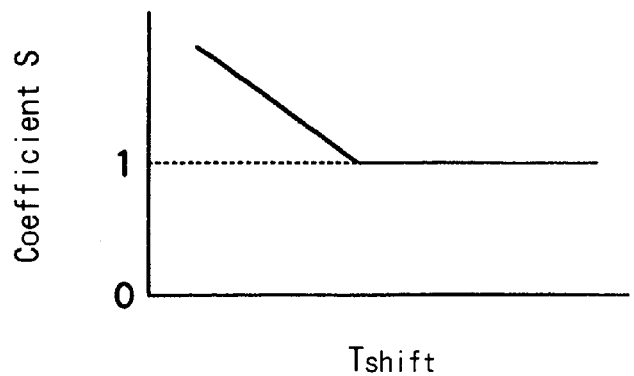
FIG. 5 is a graph illustrating the relationship between the correcting coefficient for the lubricating oil control and a shift interval.

When the shift interval is short (i.e., a busy shift) in this case, the heat may accumulate in the frictional engagement elements, and the necessary lubricating oil flow is increased according to the shift interval. Specifically, the necessary lubricating oil flow L is corrected with a coefficient S, as expressed by the following Formula 10. The coefficient S is set, as illustrated in FIG. 5, in relation to the shift interval time (Tshift).

$$L=S\cdot L \qquad \text{Formula 10.}$$

Figure 6:
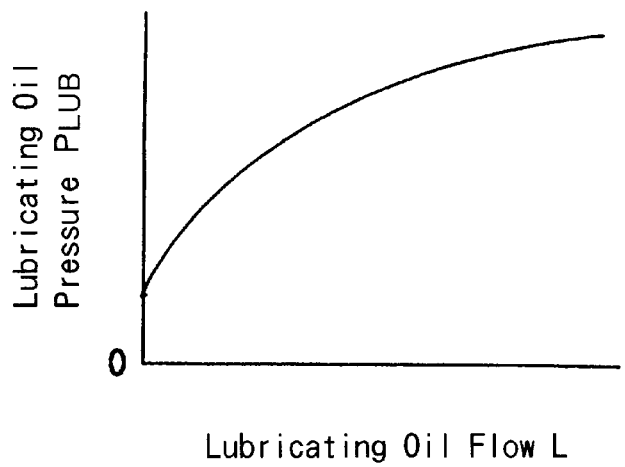
FIG. 6 is a graph illustrating the relationship between the lubricating oil pressure in the lubricating oil control and a necessary lubricating oil flow.

The lubricating oil pressure $P_{LUB}$, for achieving the necessary lubricating oil flow L through orifice 60 is thus calculated using the map data (FIG. 6) stored in advance in the electronic control unit 3. At this time, the lubricating oil flow is outputted rather more by a predetermined amount because the speed change mechanism requires the lubricating oil not only for the generated calorie but also for the ordinary gear lubrication. The relationship between the lubricating oil flow L and the lubricating oil pressure $P_{LUB}$, as noted, is illustrated in FIG. 6.

Figure 7:
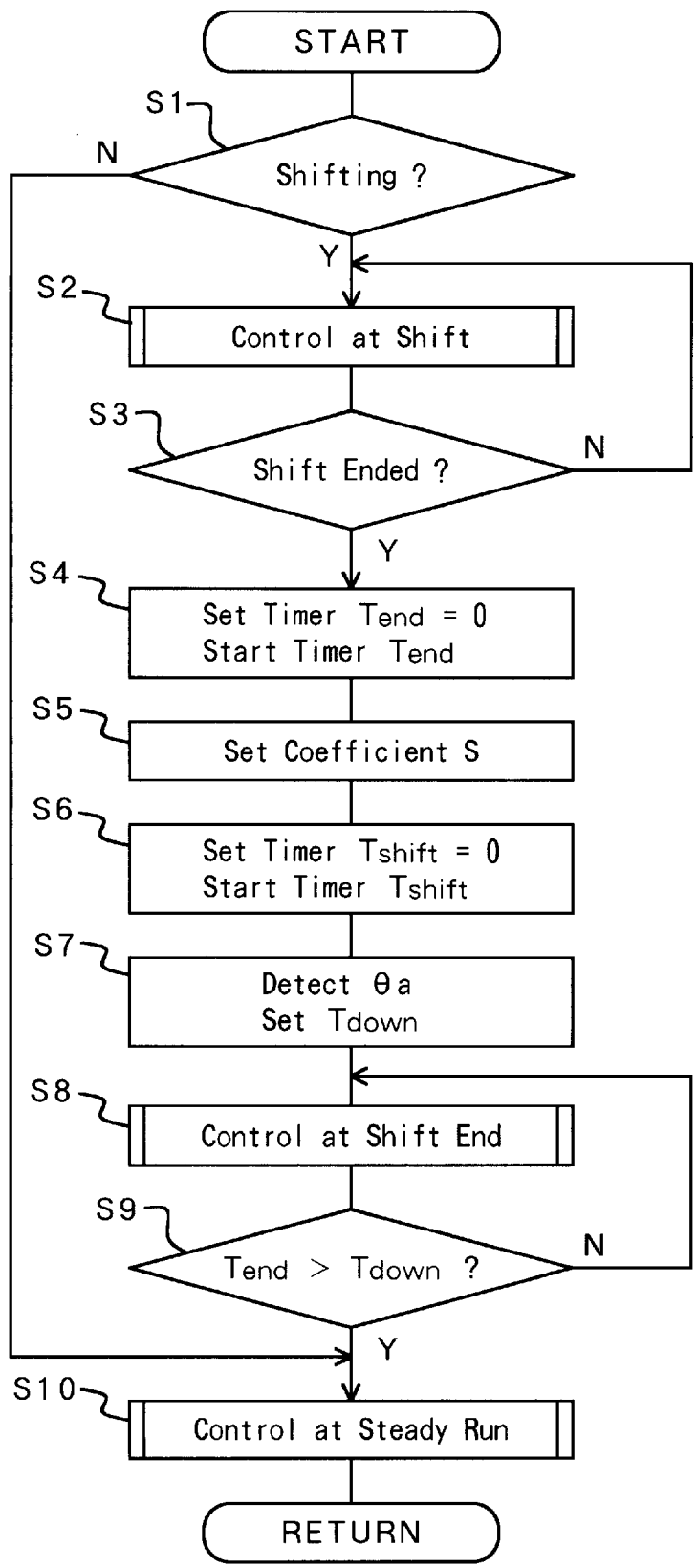
FIG. 7 is a main flow chart showing a flow of the lubricating oil control.

The lubricating oil pressure control to be executed by combining the aforementioned individual control modes is executed according to the main process flow shown in FIG. 7. The flow is started with the decision of shifting in Step S1. The decision is made on the basis of the change in the input RPM Nin to the output RPM Nout of the transmission, i.e., the change in the gear ratio. If the shifting decision is NO (N), i.e., no gear shift is taking place, the control subroutine for the steady run of Step S10 is executed without execution of any intervening steps.

Figure 8:
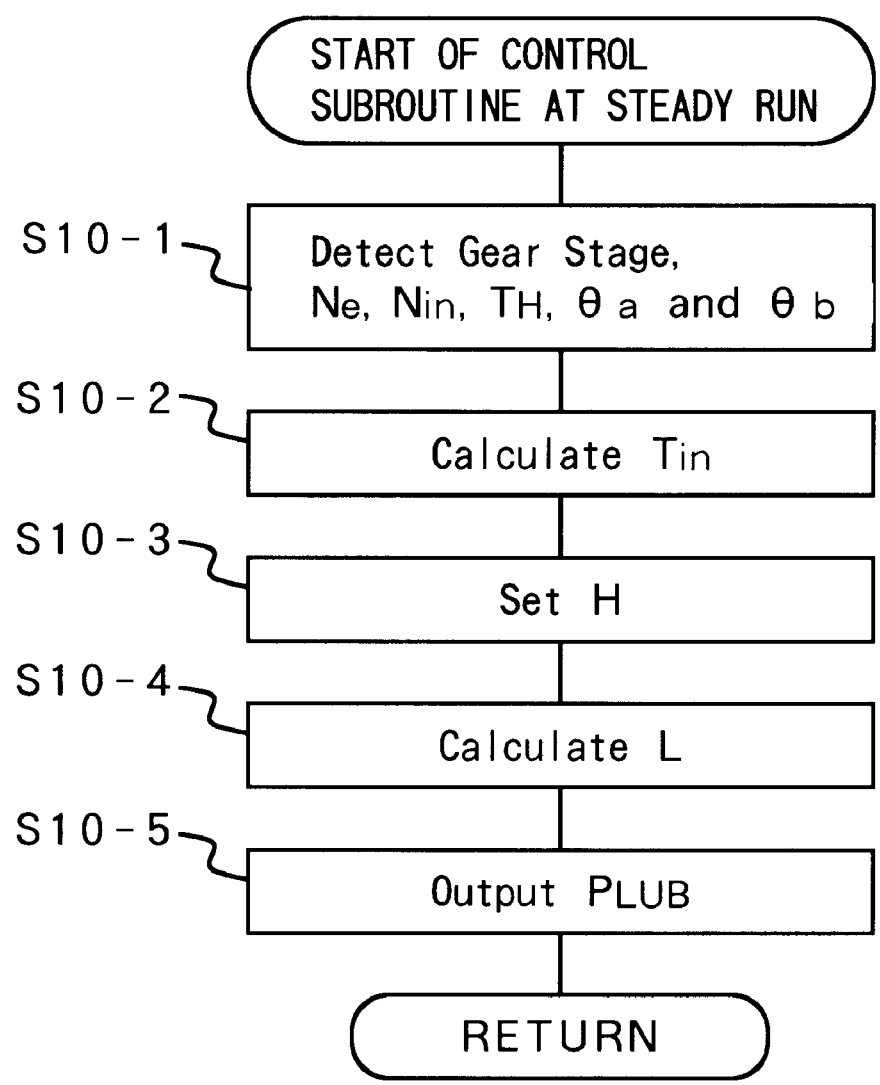
FIG. 8 is a flow chart showing a steady-run control subroutine of the main flow.
Figure 8A:
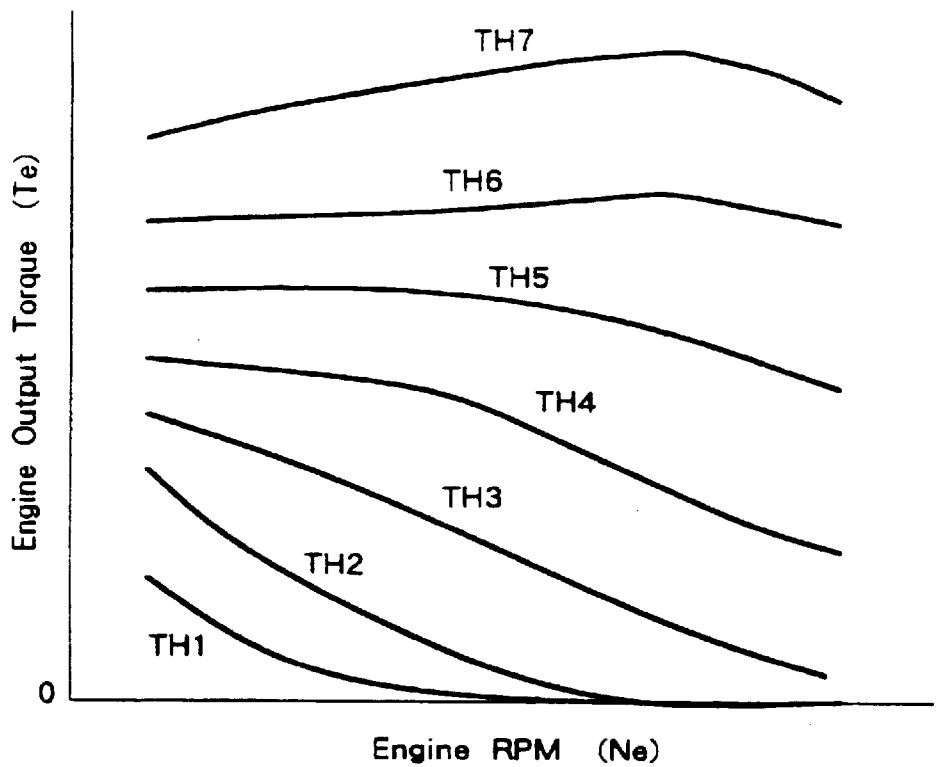
FIGS. 8A and 8B are maps used with the flow charts of FIGS. 8, 9 and 10.
Figure 8B:
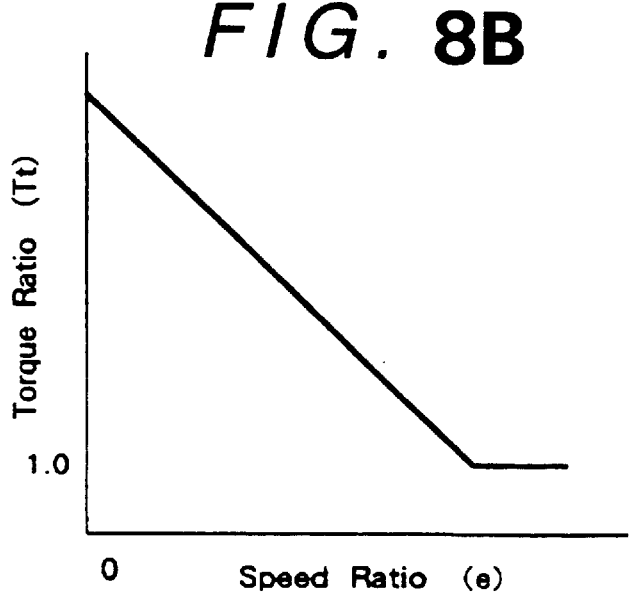
Figure 9:
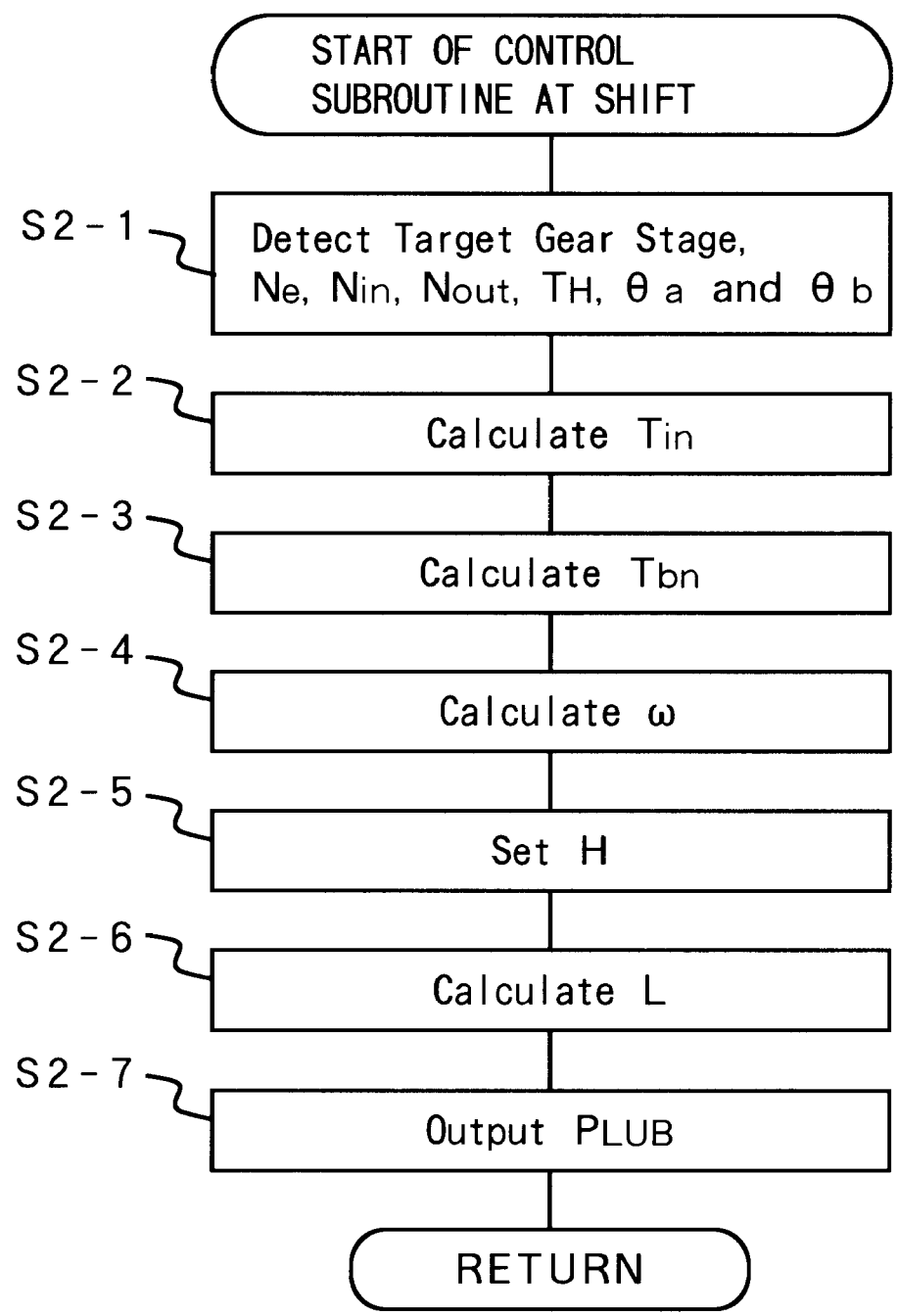
FIG. 9 is a flow chart showing a shifting control subroutine of the main flow.

As the control subroutine for the steady run of Step S10 is entered, as shown in FIG. 8, there are detected, at Step S10-1, the gear stage, the engine RPM Ne, the transmission input RPM Nin, the throttle opening TH, the ATF drain temperature θa and the ATF foreorifice temperature θb. As a result, the running situation is detected. Next, at Step S10-2, the input torque Tin is calculated. This calculation is made by reading the corresponding engine output torque from the map data, FIG. 8A, on the basis of the throttle opening TH and engine RPM Ne read before, by determining the speed ratio e (Nin/Ne) of the torque converter from the engine RPM Ne and the input RPM Nin, and determining the torque ratio $T_t$ using map data, FIG. 8B. The input torque Tin=$T_t \cdot T_e$. At Step S10-3, the correcting coefficient H is set (using FIG. 3). At next Step S10-4, the necessary lubricating oil flow L is calculated. Finally, at Step S10-5, a duty signal is outputted to the linear solenoid valve (SLJ) 57 so that the linear solenoid valve (SLJ) 57 outputs the lubricating signal pressure $P_J$ to the control valve 54 and controls the control valve 54 to output the lubricating oil pressure $P_{LUB}$, and the subroutine is ended.

Returning to the description of the main flow, and at step S1 it is determined shifting is occurring (yes), the control subroutine at the shift is executed at Step S2. In the shifting control subroutine, shown in FIG. 9, at Step S2-1 the target gear stage, the engine RPM Ne, the transmission input RPM Nin, the transmission output RPM Nout, the throttle opening TH, the ATF drain temperature θa and the ATF fore-orifice temperature θb are all detected. At Step S2-2, the input torque (Tin) is calculated. The calculation is made as described previously with respect to step S10-2 of FIG. 8. At Step S2-3, the torque sharing ratio Tbn of the frictional engagement elements is calculated as Tbn=Nout/Nin−1, where Nout/Nin is of the current gear ratio. At Step S2-4, the relative rotational speed ω in the frictional engagement elements is calculated as ω=((Nout/Nin)−GRy)/((GRx−GRy)·ω1); where GRx is the gear ratio at the gear stage before the gear change, GRy is the gear ratio at the gear stage after the gear change, and ω1 is the relative rotational speed before the gear change. At Step S2-5, the correcting coefficient H is set and at next step S2-6, the necessary lubricating oil flow L is calculated. At final Step S2-7, the lubricating oil pressure $P_{LUB}$ is outputted.

Returning again to the main flow, the routine is repeated till the shifting end decision of Step S3 is affirmed (Y). When the answer of Step S3 is YES (Y), at Step S4, the end timer for the control at the shift end is reset (Tend=0) and is started. At Step S5, the coefficient S is set (using FIG. 5). The coefficient S is prepared considering that the temperature of the frictional engagement elements is not sufficiently lowered when the shift interval is short, so as to increase the lubricating oil flow in the case of the so-called "busy shift" of a short shift interval. At Step S6, the shift timer for setting the coefficient S is reset (Tshift=0) and is started. Step S6 constitutes shift interval detecting means in a relationship between the shift end decision of Step S3 and the affirmation of the next shifting decision of a subsequent Step S1. At Step S7, moreover, the drain oil temperature θa is detected, and the lubricating time Tdown is set. At Step S8, the control subroutine for the shift end is executed.

Figure 10:
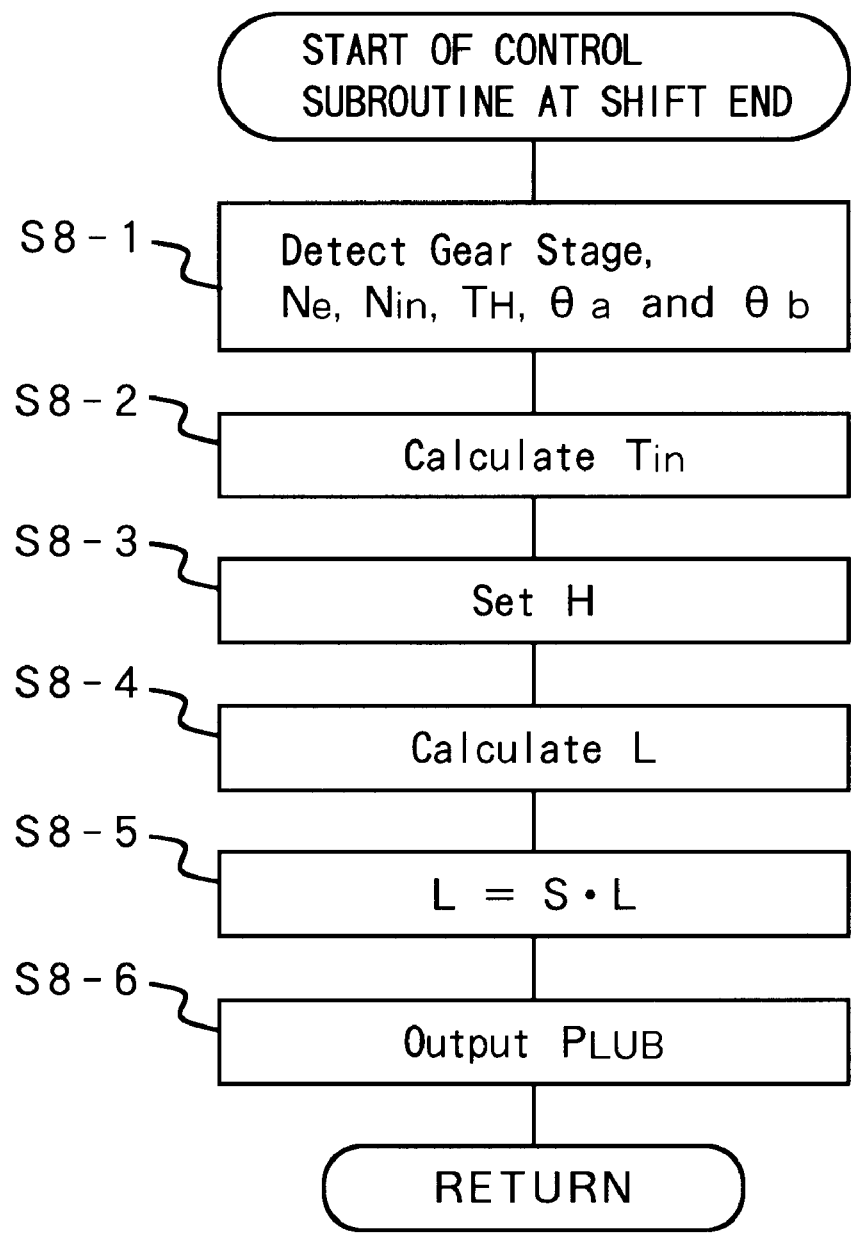
FIG. 10 is a flow chart showing a shift-end control subroutine of the main flow.

In the shift end control subroutine, as shown in FIG. 10, at Step S8-1 the gear stage, the engine RPM Ne, the transmission input RPM Nin, the throttle opening TH, the ATF drain temperature θa and the ATF foreorifice temperature θb are detected. Next, at Step S8-2, the input torque Tin is calculated. The calculation is made as described previously with respect to step S10-2 of FIG. 8. At Step S8-3, the correcting coefficient H is set. At Step S8-4, the necessary lubricating oil flow L is calculated. Moreover, at Step S8-5, the necessary lubricating oil flow L is multiplied by the correcting coefficient S to correct the necessary lubricating oil flow (L=L·S). At final Step S8-6, the lubricating oil pressure $P_{LUB}$ is output.

Returning to the main flow, the routine is repeated until it is affirmed (Y), at Step S9, that the end timer exceeds the down timer (Tend>Tdown). When the decision of Step S9 is affirmed (Y), the routine is returned, via the execution of the control subroutine, to the steady run of Step S10.

By the controls at the shift, shift end and steady run thus far described, in the hydraulic circuit shown in FIG. 2, the throttle pressure $P_{th}$ is applied to the spring-loaded end of the primary regulator valve 52 by the regulating action of the linear solenoid valve (SLT) 56, as based on the modulator pressure $P_m$. At the same time, the lubricating signal pressure $P_j$ is applied to the spool end of the control valve 54 by the regulating action of the linear solenoid valve (SLJ) 57. As a result, the spool is displaced in the balance between the lubricating signal pressure $P_j$ against the spring load and the feedback pressure of the lubricating oil pressure $P_{LUB}$ so that the lubricating oil pressure $P_{LUB}$ is fed to the speed change mechanism while being suitably drained as the secondary pressure of the basic line pressure $P_L$.

Figure 11:
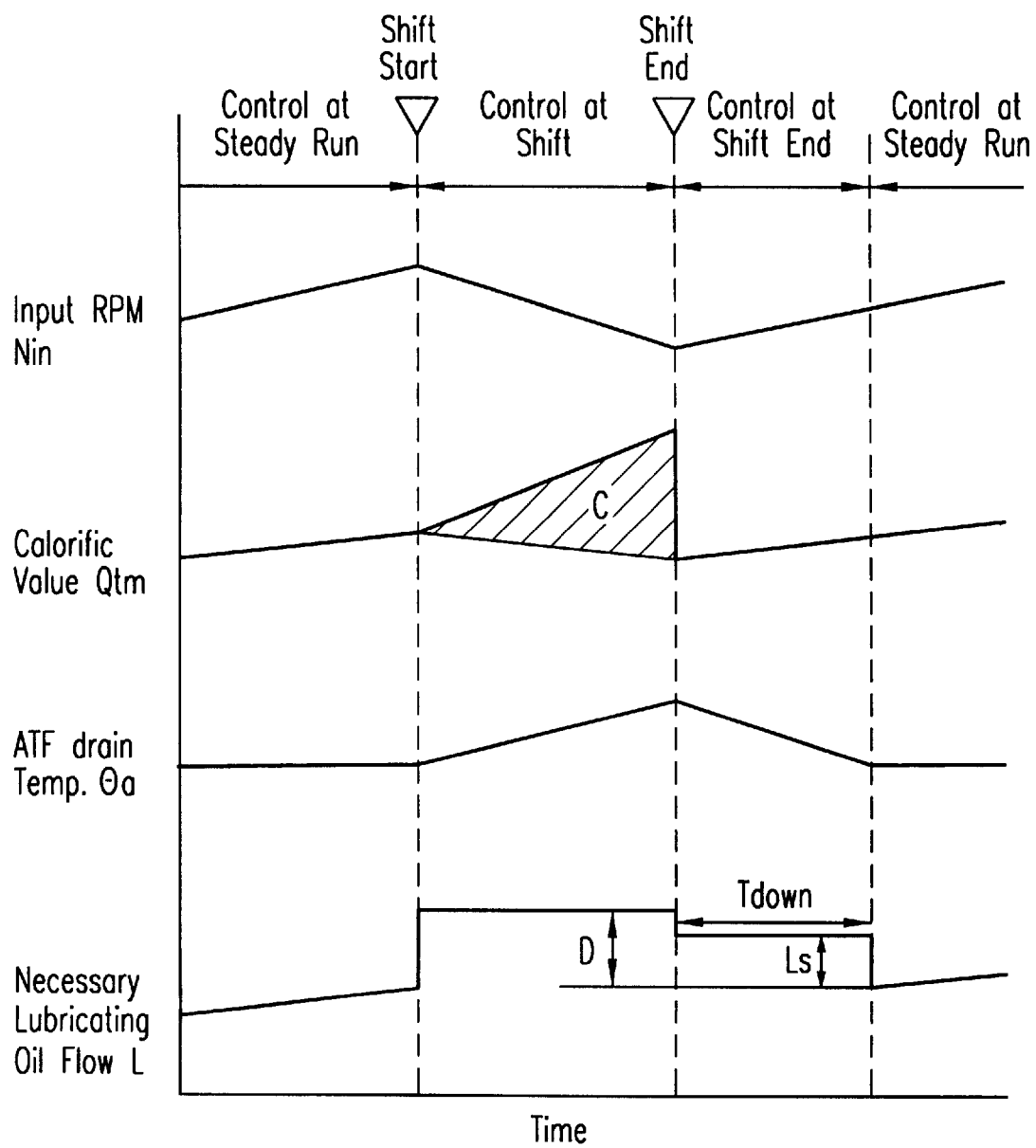
FIG. 11 is a time chart of the lubricating oil control.

FIG. 11 presents a time chart at a shift-up time as an example of the aforementioned control of the lubricating oil pressure. The chart is started from the steady run control state at the steady run of the vehicle, and the transmission input RPM Nin is in an increasing state just before the shift-up. In this state, the calorific value $Q_{tm}$ in the speed change mechanism is increasing with the increase in the RPM, and the necessary lubricating oil flow is also accordingly increasing so that the ATF drain temperature θa is held at a constant value.

When the shift is started, the input RPM Nin is lowered in synchronism with the next gear stage, and the calorific value $Q_{tm}$ in the speed change mechanism abruptly increases because the heat is generated by the slip resulting from the application and/or release of the frictional engagement element to participate in the shift. This calorific value is expressed by the integrated value (as indicated by a netted region C in FIG. 11) of the preceding calorific value $Q_s$ per unit time. At this time, the necessary lubricating oil flow L is increased in the lubricating oil flow (as indicated by D in FIG. 11) corresponding to that of the frictional engagement element by the control at the shift. Then, the ATF drain temperature θa increases.

When the shift ends, the input RPM Nin, lowered to synchronize with the next gear stage, restores the increasing state. The calorific value $Q_{tm}$ in the speed change mechanism is abruptly lowered by the elimination of the slip state, as caused by the end of the application and/or release of the frictional engagement element to cause the shift, so that it becomes lower than the calorific value at the shift start as the RPM lowers. Since the transfer of stored heat by the lubricating oil is delayed, however, the ATF drain oil temperature θa decreases during the control at the shift end and restores the temperature before the shift before long. During this shift end control, the necessary lubricating oil flow L is kept, as shown in the time chart, at a slightly lower value than the necessary lubricating oil flow L of the shift control. The shift end control period is set to the time Tdown by the timer. Here, the letter (D) appearing in FIG. 11 designates the lubricating oil flow per unit time, as required for cooling the heat of the frictional engagement elements, and the letters Ls designate the component of the lubricating oil flow for the shift end control.

According to the lubricant control system of the first embodiment, as has been detailed hereinbefore, the various conditions including the driving loss for each gear shift, the change in the input torque, the change in the RPM, the actions of the frictional engagement elements, the shift interval and the lubricating oil flow so that the necessary lubricating oil flow matching the situations of the speed change mechanism is decided. Moreover, the lubricating oil pressure according to the necessary lubricating oil flow is properly made independently of the control of the line pressure by the control of the lubricating oil pressure without being restricted by the line pressure control unlike in the prior art. As a result, without increasing the lubricating oil flow for each state of the speed change mechanism more than necessary, it is possible to prevent the reduction in the transmission efficiency of the transmission due to the agitation of the oil and to prevent the rise in the temperature of the frictional engagement elements without fail.

Figure 12:
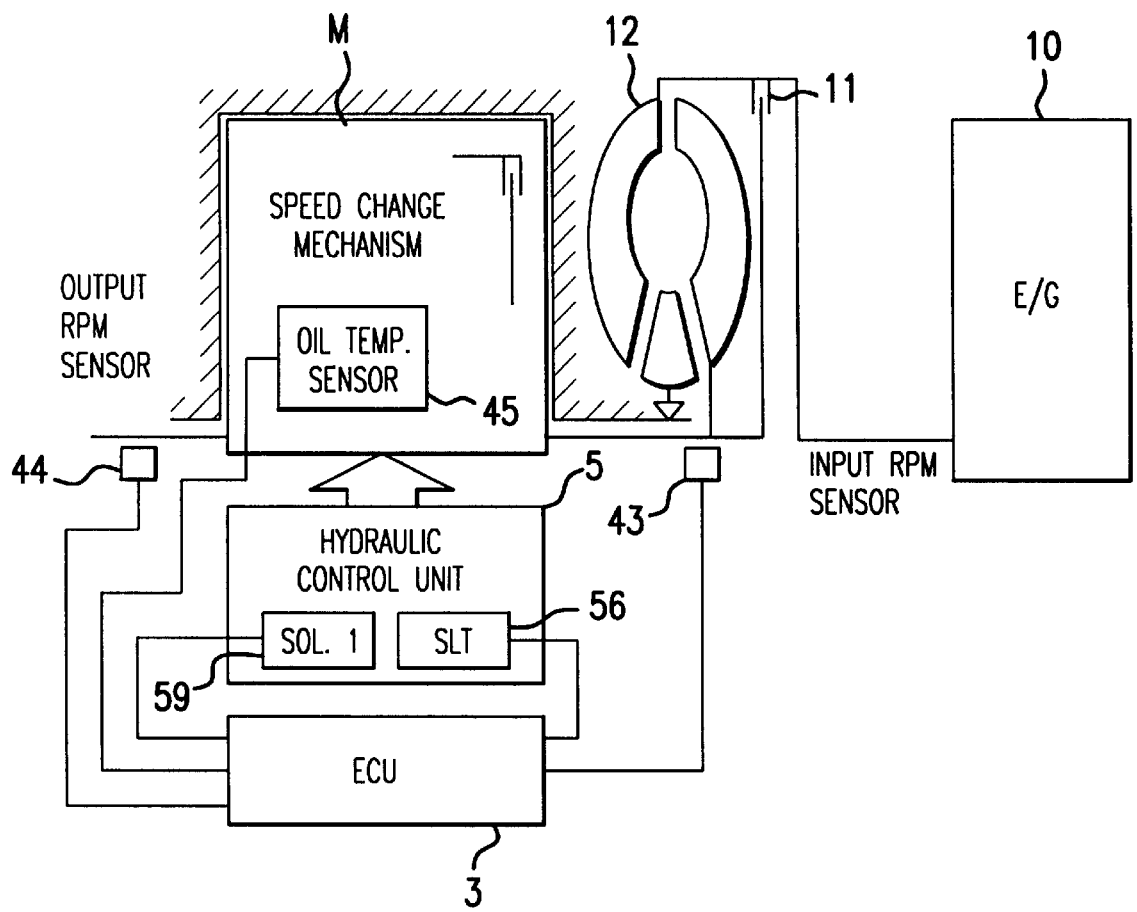
FIG. 12 is a block diagram showing a lubricant control apparatus for an automatic transmission according to a second embodiment of the invention.

FIGS. 12 to 15 show a second embodiment of the invention. This embodiment is simpler than the control of the first embodiment. FIG. 12 shows the system structure of the control apparatus of the second embodiment. The apparatus is basically similar to that of the first embodiment, but the control of the lubricating oil in this embodiment is made by deciding only whether the transmission is being shifted, so that the sensors for detecting the engine actions are omitted. Moreover, the detection of the oil temperature is necessary only for setting the timer Tdown of the shift end control so that the oil temperature sensor 45 is disposed only in the drain oil passage of the speed change mechanism. Because the lubricating oil pressure is not controlled, a solenoid valve 59 (FIG. 1) arranged at the side of the hydraulic control unit is made to be an ON/OFF solenoid valve. The remaining structures are similar to those of the first embodiment, and their description will be omitted by designating the corresponding components by similar reference numerals.

Figure 13:
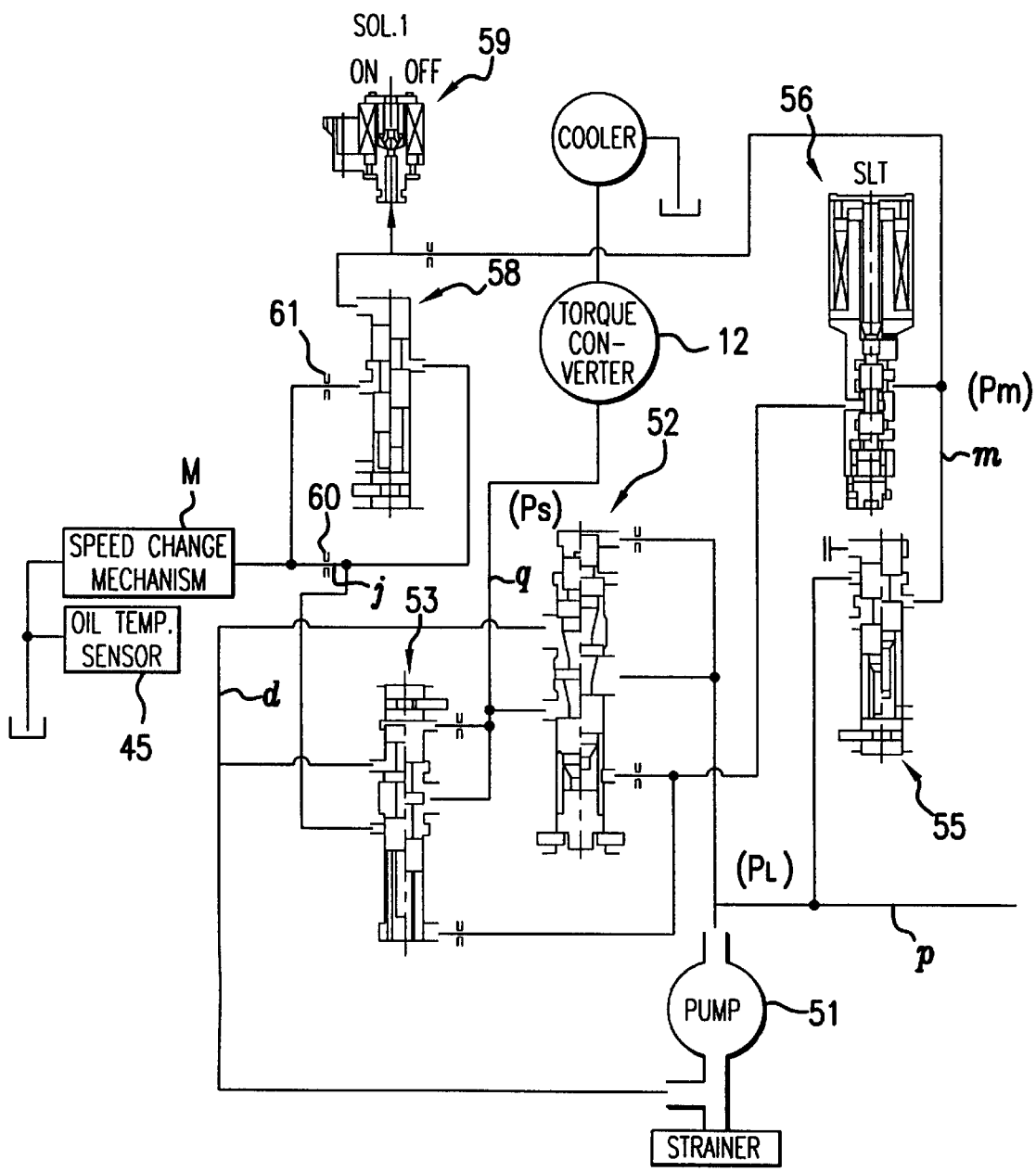
FIG. 13 is a partial circuit diagram showing a hydraulic control unit of the automatic transmission in the second embodiment.

FIG. 13 shows a circuit structure of such a portion of the hydraulic control unit 5 as relates to the feed means of the invention. In this embodiment, according to the aforementioned simplification of the controls, the control valve 58 is made to be an ON/OFF solenoid valve and arranged in parallel with the orifice 60, and the solenoid valve 59 for controlling the control valve 58 is made to be an ON/OFF type. The remaining circuit structures are substantially similar to those of the first embodiment, and their description will be omitted by designating them by similar reference numerals. The following description is restricted to the differences relating to the aforementioned points.

In this circuit, the feed oil passage j is connected, as in Related Art 1 and 2, with the output side of the secondary regulator valve 53. In the feed passage j having the orifice 60, there are arranged in series a second orifice 61 and a control valve 58 such that they bypass the orifice 60. The control valve 58 is a spool valve which is closed by a spring load and is opened at its port, when the modulator pressure $P_m$ reduced by the solenoid modulator valve 55 is fed as the solenoid signal pressure of the solenoid valve 59 to the spool terminal, thereby to establish an oil passage in which is inserted the second orifice 61 through which the control valve 58 bypasses the orifice 60. Thus, the orifice 60 is set to retain the lubricating oil flow at the steady run, and the second orifice 61 is set to retain a sufficient lubricating oil flow even at the maximum load on the speed change mechanism.

Figure 14:
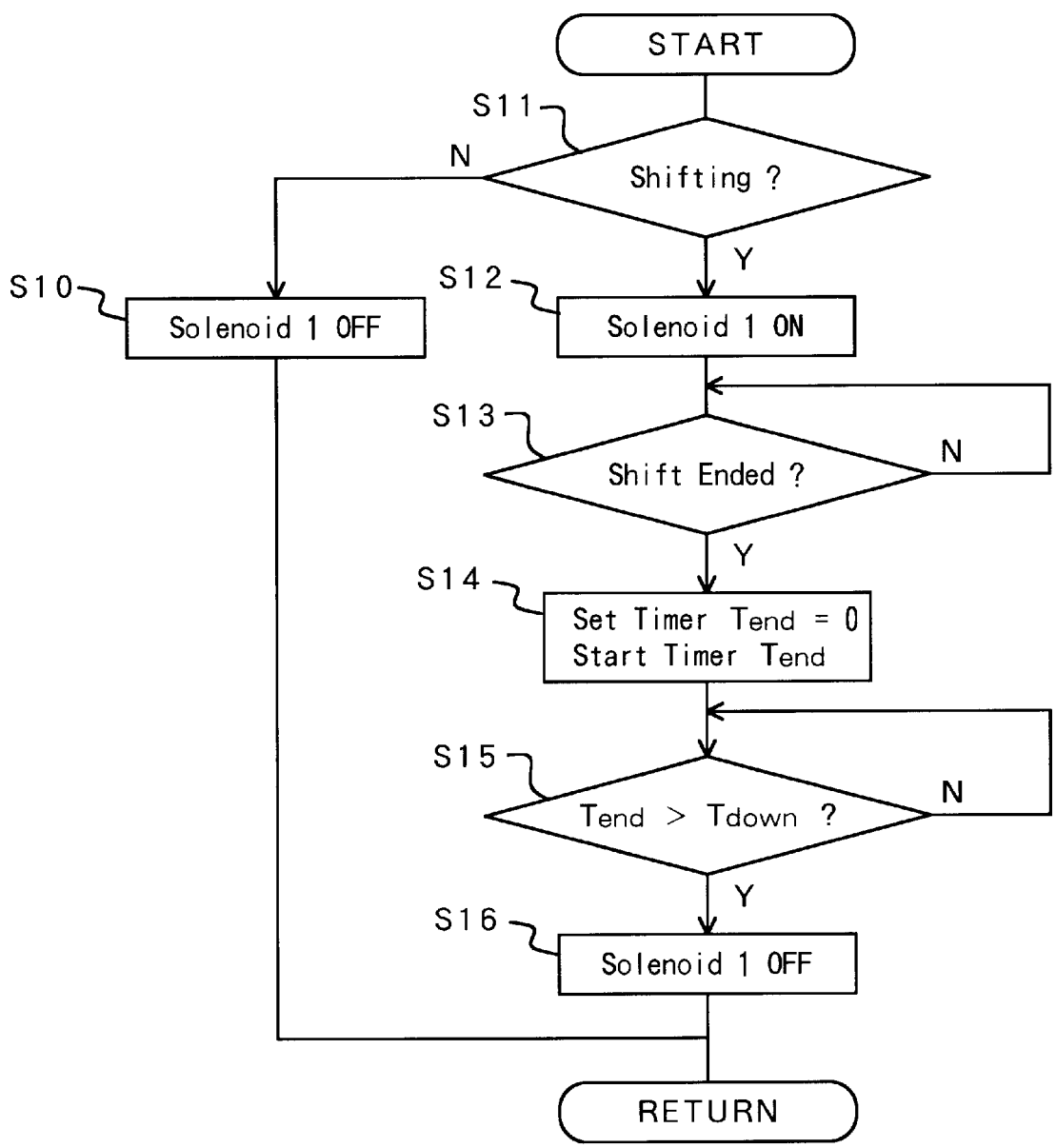
FIG. 14 is a main flow chart showing a lubricating oil control by the lubricant control apparatus in the second embodiment.

The flow of the control to be executed by the lubricant control apparatus thus structured is shown in FIG. 14. In the control, the lubricating oil pressure is replaced by the discharge pressure which is regulated from the secondary pressure $P_s$ of the secondary regulator valve 53 so that its own control is not made. In this control, it is decided at Step S11 whether the transmission is shifting. If the answer is NO (N), the solenoid signal output is turned OFF at Step S10 to open the solenoid valve 59 thereby to close the control valve 58 so that the feed passage to the speed change mechanism is only through the orifice 60. This state is continued while the answer to the decision of shifting is NO.

When the shifting decision of Step S11 is affirmed (Y), the solenoid signal output is turned ON, at Step S12, to close the solenoid valve 59 thereby opening the control valve 58 so that the feed passage to the speed change mechanism is through the two oil passages, i.e., the oil passage through the orifice 60 and the oil passage through the orifice 61 to increase the flow of lubricating oil. The shifting state is monitored at Step S13 to determine when the shift is ended. When the shifting state has ended (S13; Y) at Step S14, the end timer Tend is reset and started. It is then awaited at Step S15 until the lapsed time, counted by the end timer Tend, exceeds the time Tdown. When the decision timed has lapsed at Step S15 (Y), the solenoid signal output is turned OFF at Step S16 to open the solenoid valve 59 thereby closing the control valve 58 so that the feed passage to the speed change mechanism is returned to only the oil passage through the orifice 60 reducing the flow of lubricating oil.

Figure 15:
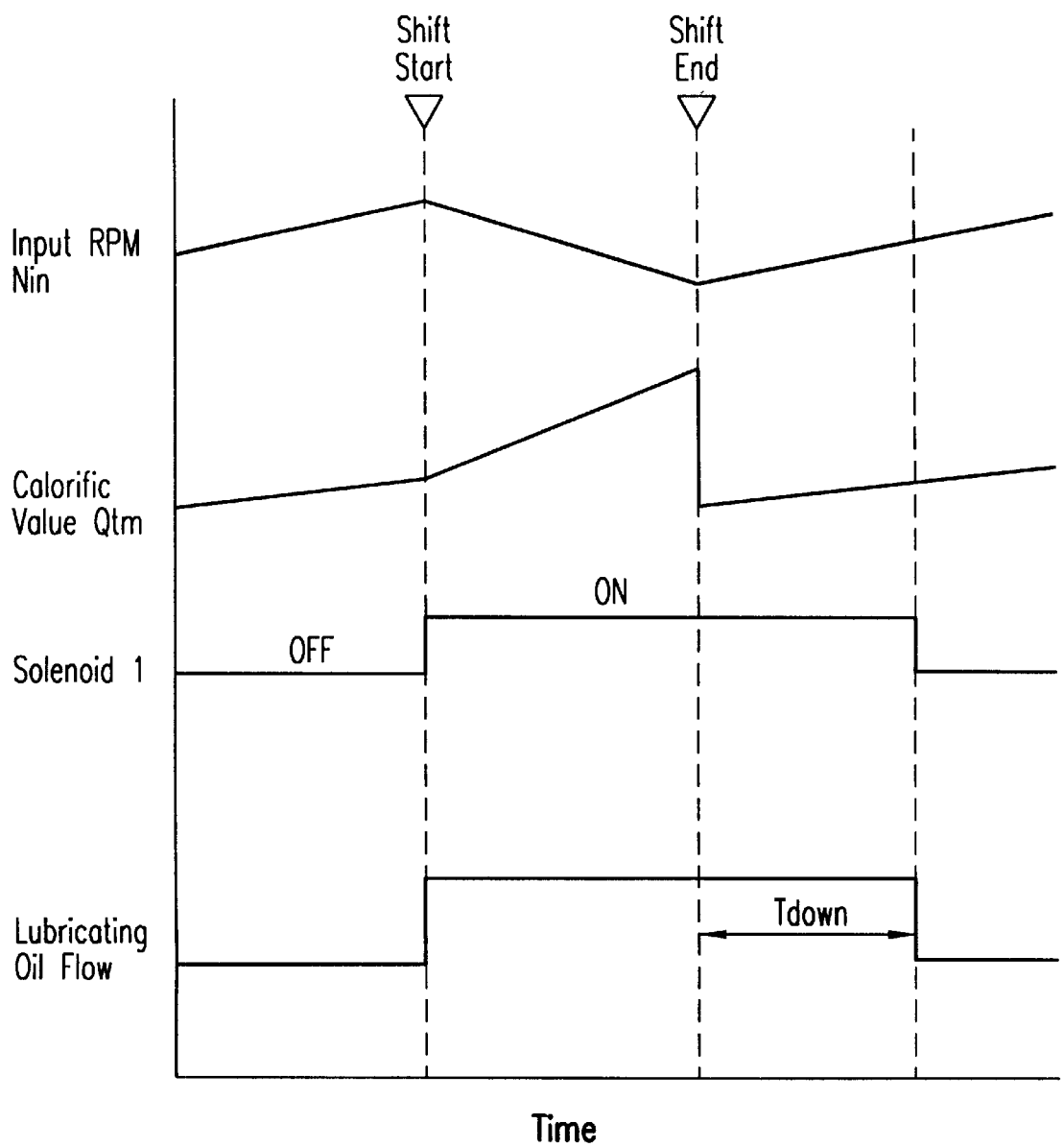
FIG. 15 is a time chart of the lubricating oil control in the second embodiment.

FIG. 15 is a time chart of the control described above. The chart starts from the steady run control state when the vehicle runs steadily, and both the transmission input RPM Nin and the calorific value $Q_{tm}$ at the speed change mechanism are similar to those of the first embodiment. However, these values are held constant because the lubricating oil flow is not controlled. When the shift is started, both the input RPM Nin and the calorific value $Q_{tm}$ in the speed change mechanism change as in the case of the first embodiment. At this time, the lubricating oil flow is increased at a stroke to the maximum by turning ON the solenoid valve. As the shift is ended, the calorific value $Q_{tm}$ in the speed change mechanism is lower than that at the shift start, but the transfer of stored heat by the lubricating oil is delayed so that the oil temperature will not soon restore the level to that of before the shift. In this embodiment as well, during the shift end control, the increasing state of the lubricating oil flow is continued to await the transfer of stored heat by the lubricating oil. Moreover, the shift end control period is set to the time Tdown by the timer. When the time elapses, the solenoid signal is turned OFF to release the increased feed of the lubricating oil.

According to the control system of the second embodiment, as has been detailed above, the lubricating oil flow is increased during the shift but need not be increased for the shift at the steady run other than the shift time. As a result, it is possible to quickly reduce the heat generated by the frictional engagement elements at the shift time and to prevent the reduction in the transmission efficiency. After the frictional engagement elements have been applied for the shift, the lubricating oil is fed at a higher rate than the lubricating oil flow corresponding to the calorific value so that the frictional engagement elements can be reliably cooled. When the temperature of the lubricating oil is low, moreover, the time period for increasing the oil flow after the shift end is determined from the temperature as the cooling efficiency drops, so that the frictional engagement elements can be reliably cooled. Thus, the second embodiment can switch the lubricating oil flow with a simple structure.

Although the invention has been described in detail in connection with its two embodiments, it can be practiced by changing the specific structure of its detail in various manners within the scope defined by the individual claims.

What is claimed is:

1. A lubricant control apparatus for an automatic transmission including a lubricating unit for feeding a lubricating oil to portions of a speed change mechanism so that heat generated in the speed change mechanism may be absorbed and recovered by the lubricating oil, the lubricant control apparatus comprising:

detecting means for detecting an acting state of the speed change mechanism;

determining means for determining necessary lubricating oil flow on the basis of a calorific value in the speed change mechanism, the calorific value being calculated based upon the detected acting state of the speed change mechanism; and feeding means for feeding the lubricating oil to the speed change mechanism on the basis of the necessary lubricating oil flow.

2. The lubricant control apparatus for an automatic transmission according to claim 1, wherein the determining means calculates the calorific value of the speed change mechanism on the basis of each gear stage to be established by the speed change mechanism.

3. The lubricant control apparatus for an automatic transmission according to claim 2, wherein the determining means calculates the calorific value of the speed change mechanism on the basis of each gear stage to be established by the speed change mechanism, an input torque to the speed change mechanism and an input RPM to the speed change mechanism.

4. The lubricant control apparatus for an automatic transmission according to claim 1, further comprising deciding means for deciding whether the automatic transmission is shifting, wherein the determining means calculates the calorific value, when the decision is affirmed, on the basis of the calorific value in at least one frictional engagement element which is applied and/or released during the shift.

5. The lubricant control apparatus for an automatic transmission according to claim 4, wherein the determining means determines the necessary lubricating oil flow for a predetermined time period after ending a shift with addition of a predetermined amount to the lubricating oil flow based on the calorific value.

6. The lubricant control apparatus for an automatic transmission according to claim 5, wherein said predetermined time period is set longer when the temperature of the lubricating oil is higher.

7. The lubricant control apparatus for an automatic transmission according to claim 5, further comprising an interval detecting means for detecting a shift interval, wherein the determining means corrects to increase the necessary lubricating oil flow for the predetermined time period after the shift end when the shift interval is short.

8. The lubricant control apparatus for an automatic transmission according to claim 1, wherein the feeding means includes:

an oil pressure source;

a first pressure regulating valve for regulating an oil pressure from the oil pressure source to a line pressure;

a second pressure regulating valve for regulating the line pressure to a lubricating oil pressure according to a signal pressure;

an oil passage for feeding the lubricating oil pressure from the second regulator valve to the speed change mechanism through an orifice;

a solenoid valve for applying the signal pressure to the second pressure regulating valve; and an output means for outputting an electric signal to the solenoid valve so that an oil pressure is produced such that an oil flow through the orifice becomes the necessary lubricating oil flow.

9. A lubricant control apparatus for an automatic transmission including a lubricating unit for feeding a lubricating oil to portions of a speed change mechanism so that heat generated in the speed change mechanism may be absorbed and recovered by the lubricating oil, the lubricant control apparatus comprising:

detecting means for detecting an acting state of the speed change mechanism, which includes at least a plurality of gear stages;

determining means for determining a necessary lubricating oil flow on the basis of a gear efficiency of a detected gear stage; and feeding means for feeding the lubricating oil to the speed change mechanism on the basis of the determined necessary lubricating oil flow.

10. The lubricant control apparatus for an automatic transmission according to claim 9, wherein the determining means determines the necessary lubricating oil flow on the basis of not only a gear stage of the speed change mechanism, but an input torque to the speed change mechanism and an input RPM to the speed change mechanism.

11. The lubricant control apparatus for an automatic transmission according to claim 9, further comprising deciding means for deciding whether the automatic transmission is shifting, wherein the determining means determines the necessary lubricating oil flow, when the decision is affirmed, on the basis of a calorific value in at least one frictional engagement element which is applied and/or released during the shift.

12. The lubricant control apparatus for an automatic transmission according to claim 9, further comprising deciding means for deciding whether the automatic transmission is shifting, wherein the determining means increases the necessary lubricating oil flow when the decision is affirmed.

13. The lubricant control apparatus for an automatic transmission according to claim 11, wherein the determining means increases the necessary lubricating oil flow for a predetermined time period after the shift end.

14. The lubricant control apparatus for an automatic transmission according to claim 13, wherein the predetermined time period is set longer when the temperature of the lubricating oil is higher.

15. The lubricant control apparatus for an automatic transmission according to claim 13, further comprising interval detecting means for detecting a shift interval, wherein the determining means corrects by increasing the necessary lubricating oil flow for the predetermined time period after the shift end when the shift interval is short.

16. The lubricant control apparatus for an automatic transmission according to claim 9, wherein the feeding means includes:

an oil pressure source;

a first pressure regulating valve for regulating an oil pressure from the oil pressure source to a line pressure;

a second pressure regulating valve for regulating the line pressure to a lubricating oil pressure according to a signal pressure;

an oil passage for feeding the lubricating oil pressure from the second pressure regulating valve to the speed change mechanism through an orifice;

a solenoid valve for applying the signal pressure to the second pressure regulating valve; and an output means for outputting an electric signal to the solenoid valve so that such an oil pressure is produced that an oil flow through the orifice becomes a necessary lubricating oil flow.

17. A lubricant control apparatus for an automatic transmission including a lubricating unit for feeding a lubricating oil to portions of a speed change mechanism so that heat generated in the speed change mechanism may be absorbed and recovered by the lubricating oil, the lubricant control apparatus comprising:

detecting means for detecting an acting state of the speed change mechanism;

deciding means for deciding whether the transmission is shifting on a basis of the acting state; and an increasing means for increasing the lubricating oil flow to the speed change mechanism when the decision is affirmed, the increasing means increases the lubricating oil flow for a predetermined time period after shift end, the predetermined time period is set longer when the temperature of the lubricating oil is higher.

18. The lubricant control apparatus for an automatic transmission according to claim 17, wherein the increasing means increases the lubricating oil flow on the basis of a calorific value in the at least one frictional engagement element when applied and/or released during the shift.

19. The lubricant control apparatus for an automatic transmission according to claim 17, further comprising interval detecting means for detecting a shift interval, wherein the determining means corrects to increase the necessary lubricating oil flow for the predetermined time period after the shift end when the shift interval is short.

20. The lubricant control apparatus for an automatic transmission according to claim 17, wherein the feeding means includes:

an oil pressure source;

a first regulator valve for regulating an oil pressure from the oil pressure source to a line pressure;

a second pressure regulating valve for regulating the line pressure a lubricating oil pressure according to a signal pressure;

an oil passage for feeding the lubricating oil pressure from the second pressure regulating valve to the speed change mechanism through an orifice;

a solenoid valve for applying the signal pressure to said second pressure regulating valve; and an output means for outputting an electric signal to the solenoid valve for a lubricating oil pressure to increase the lubricating oil flow.

21. The lubricant control apparatus for an automatic transmission according to claim 17, wherein the increasing means increases the lubricating oil flow to the speed change mechanism for a predetermined time period after the shift end.

22. The lubricant control apparatus for an automatic transmission according to claim 21, wherein the predetermined time period is set longer when the temperature of the lubricating oil is higher.

23. The lubricant control apparatus for an automatic transmission according to claim 21, wherein the increasing means is a means which is disposed in an oil passage to feed the lubricating oil from the lubricating unit to the speed change mechanism, for increasing an opening area of an orifice in the oil passage.

* * * * *

UNITED STATES PATENT AND TRADEMARK OFFICE
CERTIFICATE OF CORRECTION

PATENT NO.   : 5,961,419
DATED        : October 5, 1999
INVENTOR(S)  : Takayuki HISANO; Kazumasa TSUKAMOTO; Masahiro HAYABUCHI; Satoru KASUYA, all of Anjo, Japan It is certified that error appears in the above-identified patent and that said Letters Patent is hereby corrected as shown below:

ON THE TITLE PAGE:
Please add:  [30] Foreign Application Priority Data

November 7, 1996  [JP]  Japan .......... 8-309893

Signed and Sealed this

Thirteenth Day of June, 2000

Attest:

Q. TODD DICKINSON

*Attesting Officer*　　　　　*Director of Patents and Trademarks*